(12) United States Patent
Kusaka et al.

(10) Patent No.: US 7,837,390 B2
(45) Date of Patent: Nov. 23, 2010

(54) HYDRODYNAMIC BEARING, MOTOR INCLUDING THE SAME, AND RECORDING AND REPRODUCING APPARATUS

(75) Inventors: Keigo Kusaka, Ehime (JP); Masafumi Kumoi, Ehime (JP)

(73) Assignee: Panasonic Corporation, Osaka (JP)

( * ) Notice: Subject to any disclaimer, the term of this patent is extended or adjusted under 35 U.S.C. 154(b) by 659 days.

(21) Appl. No.: 11/812,024

(22) Filed: Jun. 14, 2007

(65) Prior Publication Data

US 2007/0292060 A1 Dec. 20, 2007

(30) Foreign Application Priority Data

Jun. 15, 2006 (JP) .............................. 2006-166554

(51) Int. Cl.
 *F16C 32/06* (2006.01)
(52) U.S. Cl. ..................... 384/107; 384/100; 384/115; 384/123
(58) Field of Classification Search ................. 384/100, 384/105, 107, 112–114, 120–121, 123; 310/90; 360/99.08
See application file for complete search history.

(56) References Cited

U.S. PATENT DOCUMENTS

| | | | | |
|---|---|---|---|---|
| 5,702,110 A * | 12/1997 | Sedy | .......................... | 277/400 |
| 5,998,898 A * | 12/1999 | Fukutani et al. | ................ | 310/90 |
| 6,456,458 B1 * | 9/2002 | Ichiyama | ................ | 360/99.08 |
| 6,831,812 B2 * | 12/2004 | Sode et al. | ............... | 360/99.08 |
| 6,877,902 B2 * | 4/2005 | Ikegawa | .................... | 384/114 |
| 6,888,278 B2 * | 5/2005 | Nishimura et al. | ............. | 310/90 |
| 7,102,851 B2 * | 9/2006 | Asada et al. | ............. | 360/99.08 |
| 7,210,850 B2 * | 5/2007 | Kusaka et | ................... | 384/107 |
| 2003/0184911 A1 * | 10/2003 | Sode et al. | ................ | 360/99.08 |
| 2004/0008911 A1 * | 1/2004 | Oelsch | ........................ | 384/100 |
| 2004/0184689 A1 * | 9/2004 | Asada et al. | ................. | 384/107 |
| 2004/0213489 A1 * | 10/2004 | Sumi et al. | ................... | 384/107 |
| 2004/0247212 A1 * | 12/2004 | Mori et al. | ................... | 384/107 |
| 2006/0029313 A1 * | 2/2006 | Hamada et al. | ............. | 384/107 |
| 2006/0140521 A1 * | 6/2006 | Uenosono et al. | ........... | 384/100 |

FOREIGN PATENT DOCUMENTS

| | | | | |
|---|---|---|---|---|
| JP | 62-270816 | | | 11/1987 |
| JP | 63-266209 | | | 11/1988 |
| JP | 7-269560 | | | 10/1995 |
| JP | 2000108025 A | * | | 4/2000 |
| JP | 2003065323 A | * | | 3/2003 |
| JP | 2003088033 A | * | | 3/2003 |
| JP | 2005009581 A | * | | 1/2005 |

* cited by examiner

*Primary Examiner*—Marcus Charles
(74) *Attorney, Agent, or Firm*—Wenderoth, Lind & Ponack, L.L.P.

(57) ABSTRACT

A hydrodynamic bearing, a motor including the same, and a recording and reproducing apparatus which can improve vibration resistance property and suppress noises even in a situation where vibration is expected are provided. Radial hydrodynamic grooves formed on an inner peripheral surface of a sleeve have a shape which satisfy the relational expression $L2<L1/2$. $L1$ refers to a length of a hydrodynamic causing portion of a radial bearing portion in an axial direction; and $L2$ refers to a length in the axial direction from a benchmark point where an end portion of the radial bearing portion on an outward side in the axial direction and center of a predetermined radial hydrodynamic groove cross each other, to a relative rotational direction backward side end portion of a radial hydrodynamic groove adjacent to the predetermined radial hydrodynamic groove on the forward side in a relative rotational direction.

10 Claims, 20 Drawing Sheets

(Backward)   Relative rotational direction   (Forward)

Shaft rotational direction

|  | Bearing diameter | Conventional bearing |
|---|---|---|
| Bearing diameter | Φ2～Φ3 | Φ2～Φ3 |
| Groove angle | Inside15°, Outside10° | 15° |
| Groove angle modified position | Φ2 | — |
| Groove width ratio (ratio between groove and ridge) | 1 : 1 | 1 : 1 |
| Groove depth | 7 μm | 7 μm |
| Lubricant viscosity | 13cP | 13cP |
| Rotation rate | 3600 rpm | 3600 rpm |

When the minimum clearance with shaft being tilted is 1μm
Compared to conventional moment (outer groove angle)

When the minimum clearance with shaft being tilted is 1μm
Compared to conventional moment (inner groove angle)

HYDRODYNAMIC BEARING, MOTOR INCLUDING THE SAME, AND RECORDING AND REPRODUCING APPARATUS

BACKGROUND OF THE INVENTION

I. Technical Field

The present invention relates to a hydrodynamic bearing which is used in motors and the like for rotationally driving recording discs such as magnetic discs, optical discs and the like, and in particular, to a hydrodynamic bearing which is compatible with miniaturization of motors, a motor including the same, and a recording and reproducing apparatus.

II. Description of the Related Art

Recently, recording apparatuses for rotationally driving recording media having a disc shape, such as magnetic discs, optical discs, magneto-optical discs, and the like have increased memory capacity and a higher transfer rate of data. Thus, bearings used in such recording apparatuses are required to hold a shaft which is driven to rotate at a high speed with high precision. Hydrodynamic bearings are used as bearings which satisfy such requirements.

In order to address the problem of a vibration due to motor imbalance or turbulence of an air flow inside a hard disc drive (hereinafter, referred to as HDD), for example, in an axial direction, forces to support the bearing at two points are enhanced by increasing the pressure peak of a radial bearing portion at two points to increase moment rigidity of the bearing portion. For improving the pressure peak of the radial bearing portion, in general, a bearing span, a groove angle of a hydrodynamic groove, a groove width ratio, a groove depth, or the like is modified.

For example, Japanese Laid-Open Publication No. 62-270816 discloses a hydrodynamic bearing which has a herringbone groove with an angle of 80 degrees or larger and below 90 degrees formed between two sets of helical grooves having an angle (groove angle) of 15 to 45 degrees with respect to the axial direction to allow an increase in the pressure generated at the hydrodynamic groove. Japanese Laid-Open Publication No. 63-266209 discloses a hydrodynamic bearing which includes a groove which connects a set of partial grooves (open V-shaped grooves) to allow improving a pressure generated at a hydrodynamic groove. Japanese Laid-Open Publication No. 7-269560 discloses a hydrodynamic bearing which includes a herringbone groove which is at least partially curved to allow increasing a pressure generated at a hydrodynamic groove. In each of the Japanese Laid-Open Publication Nos. 62-270816, 63-266209, and 7-269560, the moment rigidity of the radial portion is increased by modifying the shape of the hydrodynamic grooves and increasing the pressure generation peak.

SUMMARY OF THE INVENTION

However, the above conventional hydrodynamic bearings have the following problems.

For example, an HDD employing one of the above conventional hydrodynamic bearings is incorporated into a portable device, such as a video camera in which a recording portion is integrated with a camera (also referred to as a camcorder), a mobile phone, a portable music player or the like. If fluctuation or vibration, such as quick panning, tilting, or the like, is applied to the HDD while a rotating member having a large moment of inertia, such as a disc, is rotating rapidly and a direction of a rotational axis is being changed, a large gyroscopic moment is generated. Thus, the moment load is applied to a bearing portion. By only increasing the pressure generation peak of the bearing portion, the moment rigidity, which allows the device to bear the gyroscopic moment generated by such fluctuation or vibration, cannot be achieved. Thus, the shaft contacts the end portion of the sleeve in a tilted state. This results in a problem that a sound generated by such contact sliding is recorded as a noise. Such a problem tends to occur particularly when a motor which is made thinner is used under a high temperature environment. Such a problem tends to occur at a high temperature because the viscosity of the oil is reduced under high temperature, and thus, metal-to-metal contact between the bearing members tends to occur.

An object of the present invention is to provide a thin hydrodynamic bearing which can ensure a vibration resistance property and suppress noise generation even in a situation where a disturbance, fluctuation, or vibration is expected, a motor including the same, and a recording and reproducing apparatus.

A hydrodynamic bearing according to the first invention includes a sleeve, a shaft and a radial bearing portion. The sleeve has a bearing hole. The shaft is provided within the bearing hole of the sleeve so as to be relatively rotatable. The radial bearing portion includes a lubricant filled in a clearance formed between the sleeve and the shaft, and radial hydrodynamic grooves formed on at least one of an inner peripheral surface of the sleeve and an outer peripheral surface of the shaft, and causes hydrodynamic pressures in a radial direction of the shaft by relatively rotating between the sleeve and the shaft. The radial hydrodynamic grooves are formed so as to satisfy the following relational expression (1):

$$L2 < L1/2 \qquad (1)$$

Herein, L1 is a length from a pressure peak generation position in a pressure distribution of the hydrodynamic pressure generated at the radial bearing portion in an axial direction of the shaft to an axial direction outer end portion which is an end portion of the radial bearing portion on the outer side in the axial direction, the length being a length of a hydrodynamic causing portion corresponding to a part which has an inclination with respect to the axial direction of the shaft, and L2 is a length in the axis direction from a benchmark point where the end portion of the radial bearing portion on the outward side in the axial direction and a groove center line along a direction elongated from a predetermined radial hydrodynamic groove cross each other, to a relative rotational direction backward side end portion which is an end portion of a radial hydrodynamic groove adjacent to the predetermined radial hydrodynamic groove on the forward side in the relative rotational direction, and which is on the backward side in the relative rotational direction.

In such an example, the shaft may include a flange portion which has a larger diameter than that of the shaft. The radial bearing portion refers to a portion where the sleeve and the shaft oppose one another in the radial direction of the shaft. The relative rotational direction refers to a rotational direction of the rotating member when the radial hydrodynamic grooves are formed on the rotating member, and to a direction opposite to the rotational direction of the rotating member when the radial hydrodynamic grooves are formed on the fixed member.

The radial bearing portion causes the hydrodynamic pressures in the radial direction of the shaft by relatively rotating between the sleeve and the shaft. A "hydrodynamic causing portion" is defined as follows: in a pressure distribution of a hydrodynamic pressure in the axial direction of the shaft (hereinafter, referred to as the axial direction), there is a position where the pressure becomes the maximum. Between this position where the pressure peak is generated in the axial direction and the end portion of the radial bearing portion on the outward side in the axial direction, a part where the radial bearing portions have an inclination with respect to the axial direction of the shaft is defined as the "hydrodynamic causing portion". L1 refers to a length of the hydrodynamic causing portion in the axial direction. For example, when the radial hydrodynamic grooves are in a herringbone pattern having a substantially dogleg shape formed by connecting a pair of spiral grooves having opposite angles, L1 is a length in the axial direction from a protruded portion of the dogleg shape where it bends (a cross portion) to an end portion on the outward side of the bearing. When the end portion of the radial bearing portion on the outward side in the axial direction and a center of a predetermined radial hydrodynamic groove cross is defined as a benchmark point, L2 refers to a length in the axial direction from the benchmark point to the end portion which is an end portion of a radial hydrodynamic groove adjacent to the predetermined radial hydrodynamic groove on the forward side in the relative rotational direction, and which is on the backward side in the relative rotational direction.

The center of the radial hydrodynamic groove means a center line in a width direction of the radial hydrodynamic groove. The end portion of the radial hydrodynamic groove refers to a border between the groove portion and a portion which is not groove (raised portion, the so-called ridge) in the width direction of the radial hydrodynamic groove. The end portion of the radial hydrodynamic groove on the backward side in the relative rotational direction is a position where the maximum pressure is generated in the width direction.

Conventionally, in the hydrodynamic bearing, moment rigidity in the hydrodynamic bearing was established by increasing the generated pressure peak in the radial bearing, i.e., by individually modifying the groove angle, groove width ratio, groove depth, and the like of the hydrodynamic grooves. However, when the hydrodynamic bearing is mounted to mobile products, a portion which has conventionally been a fixed part, for example, a sleeve (in the case where the rotating member is a shaft) is shaken, and the sleeve and the shaft may contact each other during rotation. Further, increasing the pressure generation peak by modifying the above-mentioned factors, there is a limit in terms of miniaturization of the hydrodynamic bearings. Thus, the moment rigidity which allows the device to bear such vibration cannot be achieved. Thus, a problem that the shaft contacts against the sleeve in a tilted state, and the sound of contact (noise) is recorded may occur. Even when the moment rigidity can be increased, the bearing loss torque may be sacrificed. In such a case, power consumption is too large to be suitably used in a mobile product.

Therefore, in the hydrodynamic bearing according to the present invention, the groove shape of the radial hydrodynamic grooves formed on at least one of the inner peripheral surface of the sleeve and the outer peripheral surface of the shaft are formed so as to satisfy the relational expression (1), i.e., $L2<L1/2$.

In this way, hydrodynamic pressures at portions other than the pressure generation peak in the pressure distribution of the hydrodynamic pressures at the radial bearing portion rises, and the moment rigidity in the radial bearing is enhanced. In other words, by raising the hydrodynamic pressure at a position close to the position where the shaft and the sleeve contact each other, the moment rigidity in the radial bearing portion is enhanced in order to avert contact between shaft and the sleeve or to mitigate impact of the impact.

As a result, even when the hydrodynamic bearing is used in a situation where vibration is expected, for example, as a mobile product, the vibration resistance property is secured and noises can be suppressed.

A hydrodynamic bearing of the second embodiment of the invention is a hydrodynamic bearing of the first embodiment of the invention, in which the groove angle of the radial hydrodynamic groove on the hydrodynamic causing portion and near the pressure peak generation position is in a scope from 7 to 20 degrees.

As used herein, the groove angle refers to an angle of inclination of the radial hydrodynamic grooves with respect to the relative rotational direction.

With such a structure, loss torque can be prevented from increasing. As a result, in normal condition, power consumption becomes small and translational rigidity in the radial direction can be increased. By the way, "normal condition" means the condition that large disturbance is not applied to the motor, in this case.

A hydrodynamic bearing of the third embodiment of the invention is a hydrodynamic bearing of the first embodiment of the invention, in which the groove angle of the radial hydrodynamic grooves is modified in a portion between the pressure peak generation position and the end portion on the outward side in the axial direction, and the groove angle on the end portion on the outward side in the axial direction is in a scope from 5 to 12 degrees.

With such a structure, a portion which introduces the lubricant becomes shallow. Thus, the lubricant can be readily sucked and the hydrodynamic pressure to be generated can be increased. Further, an edge angle in an area where the shaft and the sleeve are likely to collide with each other, which will be described later, can be made smaller. Thus, the sound of impact becomes smaller, and the abrasion can be suppressed and lengthen the life.

A hydrodynamic bearing of the fourth embodiment of the invention includes a sleeve, a shaft and a radial bearing portion. The sleeve has a bearing hole. The shaft is provided within the bearing hole of the sleeve so as to be relatively rotatable. The radial bearing portion includes a lubricant filled in a clearance formed between the sleeve and the shaft and radial hydrodynamic grooves formed on at least one of an inner peripheral surface of the sleeve and an outer peripheral surface of the shaft, and causes hydrodynamic pressures in a radial direction of the shaft by relatively rotating between the sleeve and the shaft.

In such a hydrodynamic bearing, the groove angle of the radial hydrodynamic grooves is modified in a portion between a pressure peak generation position in a pressure distribution of the hydrodynamic pressure generated at the radial bearing portion in an axial direction of the shaft and the end portion on the outward side in the axial direction. Specifically, the groove angle $\theta1$ on the end portion on the outward side in the axial direction is in a scope from 5 to 12 degrees. The groove angle $\theta2$ of the radial hydrodynamic groove on the hydrodynamic causing portion and near the pressure peak generation position is in a scope from 7 to 20 degrees. The groove angle $\theta1$ is set to be smaller than the groove angle $\theta2$.

In this way, hydrodynamic pressures at portions other than the pressure generation peak in the pressure distribution of the hydrodynamic pressures at the radial bearing portion rises, and the moment rigidity in the radial bearing is enhanced. In other words, by raising the hydrodynamic pressure at a position close to the position where the shaft and the sleeve contact each other, the moment rigidity in the radial bearing portion is enhanced in order to avert contact between shaft and the sleeve or to mitigate impact of the contact.

As a result, even when the hydrodynamic bearing is used in a situation where vibration is expected, for example, as a mobile product, the vibration resistance property is secured and noises can be suppressed. The loss torque can be prevented from increasing. As a result, in normal condition, power consumption becomes small and translational rigidity in the axial direction can be increased.

A hydrodynamic bearing of the fifth embodiment of the invention includes a fixed member, a rotating member, and a thrust bearing portion. The rotating member provided so as to oppose the fixed member with a small clearance in an axial direction interposed therebetween. On at least one of opposing surfaces of the rotating member and the fixed member which form the small clearance therebetween, thrust hydrodynamic grooves are formed. A lubricant is filled in the clearance to form the hydrodynamic bearing. By relatively rotating the fixed member and the rotating member, hydrodynamic pressures are generated in the axial direction of the rotating member. The thrust hydrodynamic grooves are formed so as to satisfy the following relational expression (2):

$$\Delta R < (Do - Dcr)/2 \quad (2)$$

Herein, Do is an outermost diameter of the thrust hydrodynamic grooves in the thrust bearing portion, Di is an innermost diameter of the thrust hydrodynamic grooves in the thrust bearing portion, Dcr is a diameter such that an area of a circular portion having the inner diameter Dcr and the outer diameter Do is ¼ the area of a circular portion having the inner diameter Di and the outer diameter Do, and $\Delta R$ is a length in the radial direction of the thrust bearing portion from a benchmark point where the outer diameter end portion of the thrust bearing portion and a groove center line along a direction elongated from a predetermined thrust hydrodynamic groove cross each other, to a relative rotational direction backward side end portion, which is an end portion of a thrust hydrodynamic groove adjacent to the predetermined thrust hydrodynamic groove on the forward side in the relative rotational direction and which is on the backward side in the relative rotational direction.

If the bearing is a shaft rotational type, the rotating member means a shaft, a thrust flange attached thereto, a rotor hub or the like in general. The fixed member corresponds to a sleeve, a thrust plate or the like. If the bearing is the shaft fixed type, the rotating member means a sleeve, a thrust plate, a rotor hub or the like in general. The fixed member corresponds to a shaft, a thrust flange attached thereto or the like.

As used herein, the thrust bearing portion refers to a part where the rotating member and the fixed member oppose each other in the axial direction and substantially generates thrust hydrodynamic pressures. For example, when the thrust plate is larger than the outer diameter of the shaft, a part where the shaft and the thrust plate oppose each other, i.e., an area inside the outermost diameter of the shaft is referred to as the thrust bearing portion. Moreover, the part is provided with the hydrodynamic grooves for generating hydrodynamic pressures.

The relatively rotational direction refers to a rotational direction of the rotating member when the thrust hydrodynamic grooves are formed on the rotating member, and to a direction opposite to the rotational direction of the rotating member when the thrust hydrodynamic grooves are formed on the fixed member. The end portion of the thrust hydrodynamic groove on the backward side in the relative rotational direction is a position where the maximum pressure is generated in the width direction.

Herein, Do is an outermost diameter of the thrust hydrodynamic groove formed in a portion where the shaft and the thrust plate oppose each other, i.e., the outermost diameter of the thrust hydrodynamic groove in the thrust bearing portion. Di is an innermost diameter of the thrust hydrodynamic groove formed in a portion where the shaft and the thrust plate oppose each other, i.e., the innermost diameter of the thrust hydrodynamic groove in the thrust bearing portion. When Dcr is defined as in the following relational expression (3), an area of a circular portion having an outer diameter Dcr and the inner diameter Di is ¾ the area of the circular portion having the outer diameter Do and the inner diameter Di.

$$Dcr = \sqrt{Do^2 - \frac{(Do^2 - Di^2)}{4}} \quad (3)$$

Conventionally, in the hydrodynamic bearing, moment rigidity in the hydrodynamic bearing was obtained by increasing the pressure generation peak in the thrust bearing, i.e., by individually modifying the groove angle, groove width ratio, groove depth, and the like of the hydrodynamic grooves. However, when the hydrodynamic bearing is mounted to mobile products, a portion which has conventionally been a fixed part, for example, a sleeve and thrust plate (in the case where the rotating member is a shaft) itself is shaken, and the thrust plate and the shaft may contact each other during rotation. Further, when increasing the pressure generation peak by modifying the above-mentioned factors, there is a limit in terms of miniaturization of the hydrodynamic bearings. Thus, the moment rigidity which allows the device to bear such vibration cannot be achieved. Thus, a problem that the shaft contacts against the thrust plate in a tilted state, and the sound of contact (noise) is recorded may occur. Such a phenomenon tends to occur in a thin motor having a bearing portion of a shorter length in the axial direction, for example, an HDD for mobile use. Furthermore, noises become further larger under a high temperature where the oil viscosity becomes lower.

Therefore, in the hydrodynamic bearing according to the present invention, the thrust hydrodynamic grooves formed on at least one of the rotating member and fixed member are formed so as to satisfy the condition $\Delta R < (Do-Dcr)/2$. As used herein, $\Delta R$ is a length in the radial direction of the thrust bearing portion from a benchmark point where the outer diameter end portion of the thrust bearing portion and a center of a predetermined thrust hydrodynamic groove cross each other, to a relative rotational direction backward side end portion of a thrust hydrodynamic groove adjacent to the predetermined thrust hydrodynamic groove on the forward side in the relative rotational direction.

In this way, hydrodynamic pressures at portions other than the pressure generation peak in the pressure distribution of the hydrodynamic pressures in the radial direction of the shaft rises, and the moment rigidity in the thrust bearing is enhanced. In other words, since there is a limit in obtaining the moment rigidity by increasing the pressure generation peak under the condition of miniaturizing the hydrodynamic bearings, by raising the hydrodynamic pressure at a position close to the position where the shaft and the thrust plate contact each other, the moment rigidity in the thrust bearing portion is enhanced in order to avert contact between the shaft and the sleeve or to mitigate impact of the contact.

As a result, even when the hydrodynamic bearing is used in a situation where vibration is expected, for example, as a mobile product, the vibration resistance property is secured and noises can be suppressed.

A hydrodynamic bearing of the sixth embodiment of the invention is a hydrodynamic bearing of the fifth embodiment of the invention, in which the groove angle of the thrust hydrodynamic groove on an inner peripheral side in the radial direction is in a scope from 7 to 20 degrees.

As used herein, the groove angle refers to an angle formed by a tangent at an arbitrary point on the boundary line of the thrust hydrodynamic groove and a tangent of a circle having the center of the thrust bearing portion as a center which passes through the arbitrary point. For example, when the shape of the thrust hydrodynamic grooves is logarithmic helix, the groove angle is an angle formed by the tangent direction of the above circle and the tangent direction of the logarithmic helix.

With such a structure, an edge angle can be made smaller and loss torque can be prevented from increasing. As a result, even when the rotating member and the fixed member collide with each other, they collide smoothly. Thus, an effect of mitigating impact at contact becomes significant. Also, in normal condition, power consumption becomes small and translational rigidity in the axial direction can be increased.

A hydrodynamic bearing of the seventh embodiment of the invention is a hydrodynamic bearing of the fifth embodiment of the invention, in which the groove angle of the thrust hydrodynamic grooves is modified in a portion between the center and the end portion of the thrust bearing portion in the radial direction, and the groove angle on the end portion on the outward side in the radial direction is in a scope from 5 to 12 degrees.

With such a structure, a portion which introduces the lubricant becomes shallow. Thus, the lubricant can be readily sucked and the hydrodynamic pressure to be generated can be increased.

A hydrodynamic bearing of the eighth embodiment of the invention includes a fixed member, a rotating member provided so as to oppose the fixed member with a small clearance in an axial direction interposed therebetween, and a thrust bearing portion which includes a lubricant filled in the clearance and thrust hydrodynamic grooves formed on at least one of the rotating member and the fixed member, and which generates hydrodynamic pressures by relatively rotating between the fixed member and the rotating member, in which the groove angle of the thrust hydrodynamic grooves is modified between the inner peripheral side of the thrust bearing portion in the radial direction and the end portion of the thrust bearing portion on the outward side in the radial direction, and the groove angle $\theta 6$ on the end portion on the outward side in the axial direction is in a scope from 5 to 12 degrees, the groove angle $\theta 5$ of the thrust hydrodynamic groove on an inner peripheral side in the radial direction is in a scope from 7 to 20 degrees, and the groove angle $\theta 6$ of the end portion on the outward side in the radial direction is smaller than the groove angle $\theta 5$ of the inner peripheral side in the radial direction.

In this way, hydrodynamic pressures at portions other than the pressure generation peak in the pressure distribution of the hydrodynamic pressures in the radial direction of the shaft rises, and the moment rigidity in the thrust bearing is enhanced. In other words, since there is a limit in obtaining the moment rigidity by increasing the pressure generation peak under the condition of miniaturizing the hydrodynamic bearings, by raising the hydrodynamic pressure at a position close to the position where the shaft and the thrust plate contact each other, the moment rigidity in the thrust bearing portion is enhanced in order to avert contact between shaft and the sleeve or to mitigate impact of the contact.

As a result, even when the hydrodynamic bearing is used in a situation where large vibration is expected, for example, as a mobile product, the vibration resistance property is secured and noises can be suppressed. Further, in normal condition, power consumption becomes small and translational rigidity in the axial direction can be increased.

A motor according to the ninth, tenth, eleventh, or twelfth embodiments of the invention includes a hydrodynamic bearing according to first, fourth, fifth or eighth embodiment of the invention, a base, a stator, and a hub. The hydrodynamic bearing is mounted to the base. The stator is fixed to the base. A rotor magnet is provided so as to oppose the stator, and forms a magnetic circuit with the stator. The hub is for fixing the rotor magnet.

With such a structure, even when the motor is used in a situation where large vibration is expected, the vibration resistance property is secured and noises can be suppressed.

A recording and reproducing apparatus of the thirteenth, fourteenth, fifteenth, or sixteenth embodiments of the invention includes a motor of the ninth, tenth, eleventh, or twelfth embodiments of the invention, a recording medium and information access means. The information medium is fixed to the hub and information can be recorded thereon. The information access means is for writing or reading information at a desired position on the recording medium.

With such a structure, even when the apparatus is used in a situation where large vibration is expected, the vibration resistance property is secured and noises can be suppressed.

According to the hydrodynamic bearing, the motor including the same and the recording and reproducing apparatus of the present invention, even when it is used in a situation where large vibration is expected, the vibration resistance property is secured and noises can be suppressed.

DETAILED DESCRIPTION OF THE INVENTION

Hereinafter, a motor 1 including a hydrodynamic bearing according to an embodiment of the present invention will be described with reference to the drawings.

Figure 1:
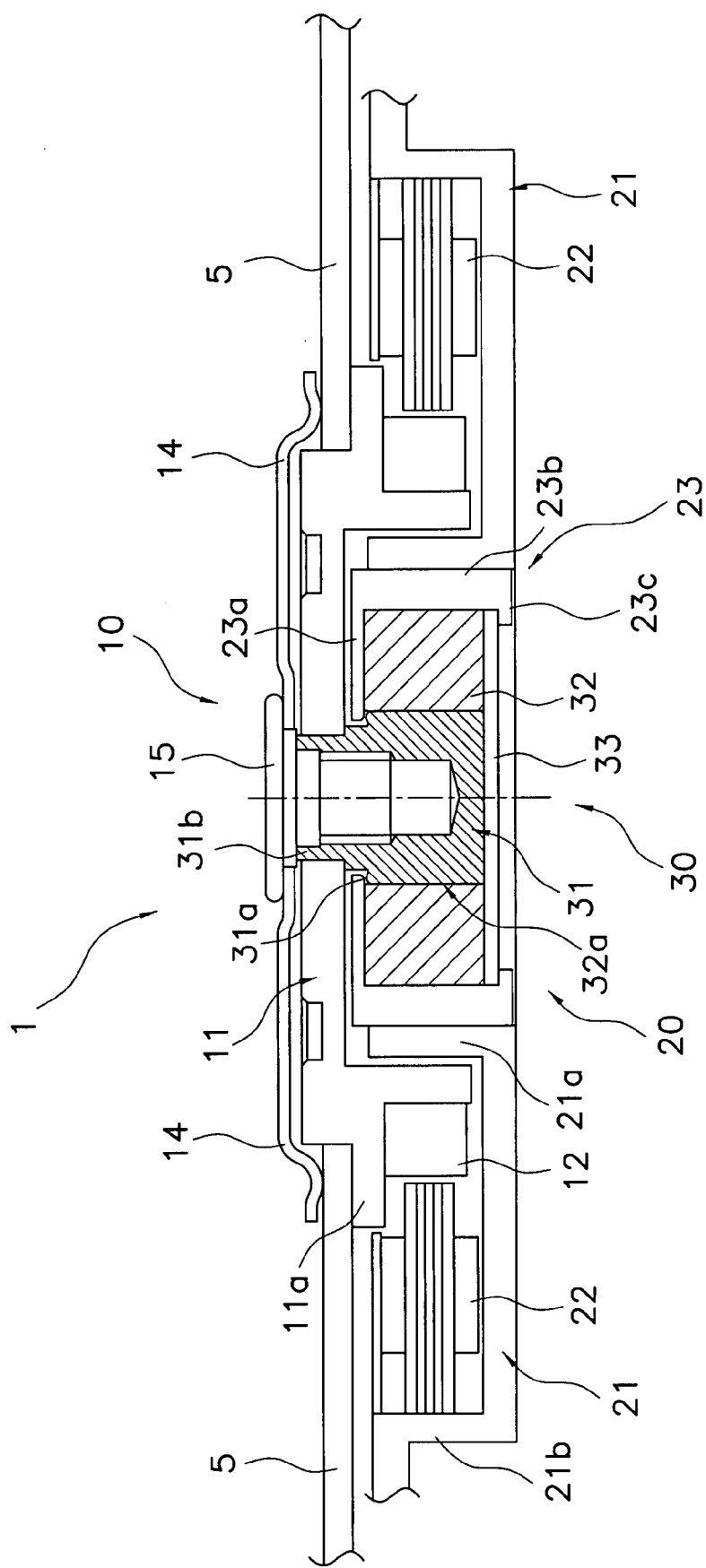
FIG. 1 is an outline view showing a motor including a hydrodynamic bearing according to an embodiment of the present invention.

In the following description, a vertical direction in FIG. 1 is referred to as "axial direction"; an upward direction is referred to as "upward side in the axial direction" (outward side in the axial direction); and a downward direction is referred to as "downward side in the axial direction" (outward side in the axial direction). However, such expressions do not limit how the actual hydrodynamic bearing 30 is attached.

[Structure of Motor 1]

As shown in FIG. 1, a motor 1 according to the present embodiment is a device for rotationally driving a recording disc (recording medium) 5, and mainly includes a rotating member 10, a stationary member 20, and a hydrodynamic bearing 30.

The rotating member 10 mainly includes a hub 11 to which the recording disc 5 is mounted, and a rotor magnet 12.

The hub 11 is formed of, for example, a stainless steel, which is one of ferrous metal materials (for example, martensitic steels or ferritic steels, such as DHS1 and the like). The hub 11 is press-fitted and adhered to a shaft 31 so as to be integral with the shaft 31. Further, the hub 11 includes a disc loading portion 11a for loading the recording disc 5 integrally formed around an outer peripheral portion.

The rotor magnet 12 is fixed to the outer peripheral surface of the hub 11 and forms a magnetic circuit with a stator 22, which will be described in details later. The rotor magnet 12 is formed of a magnet material of a high energy product such as neodymium, iron, boronic resin magnet and the like. A surface of the rotor magnet 12 is treated with epoxy resin coating, nickel plating or the like in order to prevent rusting and also chipping.

The recording disc 5 is loaded on the disc loading portion 11a, and is pressed downward in the axial direction by a clamper 14. The clamper 14 is fixed to an upper side of the shaft 31 in the axial direction with a screw 15. The recording disc 5 is interposed between the clamper 14 and the disc loading portion 11a.

As shown in FIG. 1, the stationary member 20 is mainly formed of a base 21, a stator 22, a bracket 23 fixed to the base 21.

The base 21 also serves as a housing of the recording and reproduction apparatus, and includes a first base portion 21a and a second base portion 21b for attaching the stator 22. The first base portion 21a is a fundamental portion of a hydrodynamic bearing 30, which will be described later. The base 21 is formed of aluminum metal materials or ferrous metal materials. If the base 21 is formed of a base material which is a non magnetic metal material such as aluminum metals, austenitic stainless materials or the like, a suction ring having a ring shape is fixed on the base 21 by adhering or the like at a position so as to oppose the rotor magnet 12. Between the suction ring or the base 21 of a magnetic material and the rotor magnet 12, an attractive force in the axial direction is generated. The attractive force in the axial direction secures stiffness of a thrust bearing portion, which will be described later.

The stator 22 is fixed to the second base portion 21b and is located at a position so as to oppose the rotor magnet 12. A stator core of the stator 22 is formed of a silicon steel plate having a thickness of 0.15 to 0.20 mm.

The bracket 23 includes an upper holding portion 23a having an opening thorough which a convex portion 31b of the shaft 31 is inserted, a cylindrical side portion 23b which is connected to the upper holding portion 23a and is relatively thick, and a cylindrical lower holding portion 23c which is connected to the side portion 23b and is thinner than the side portion 23b. As shown in FIG. 1, when the sleeve 32 is inserted into the bracket 23, the upper holding portion 23a of the bracket 23 covers an upper end surface of the sleeve 32 and a step portion 31a of the shaft 31, and the side portion 23b covers a side surface of the sleeve 32. Since an inner peripheral portion of the upper holding portion 23a of the bracket 23 covers the step portion 31a of the shaft 31, the bracket 23 serves as a stopper for the shaft 31. The bracket 23 may be formed of a stainless steel having a high mechaniability which is different from that for the shaft 31 or a stainless steel having a high pressing ability.

[Detailed Structure of Hydrodynamic Bearing 30]

Figure 2:
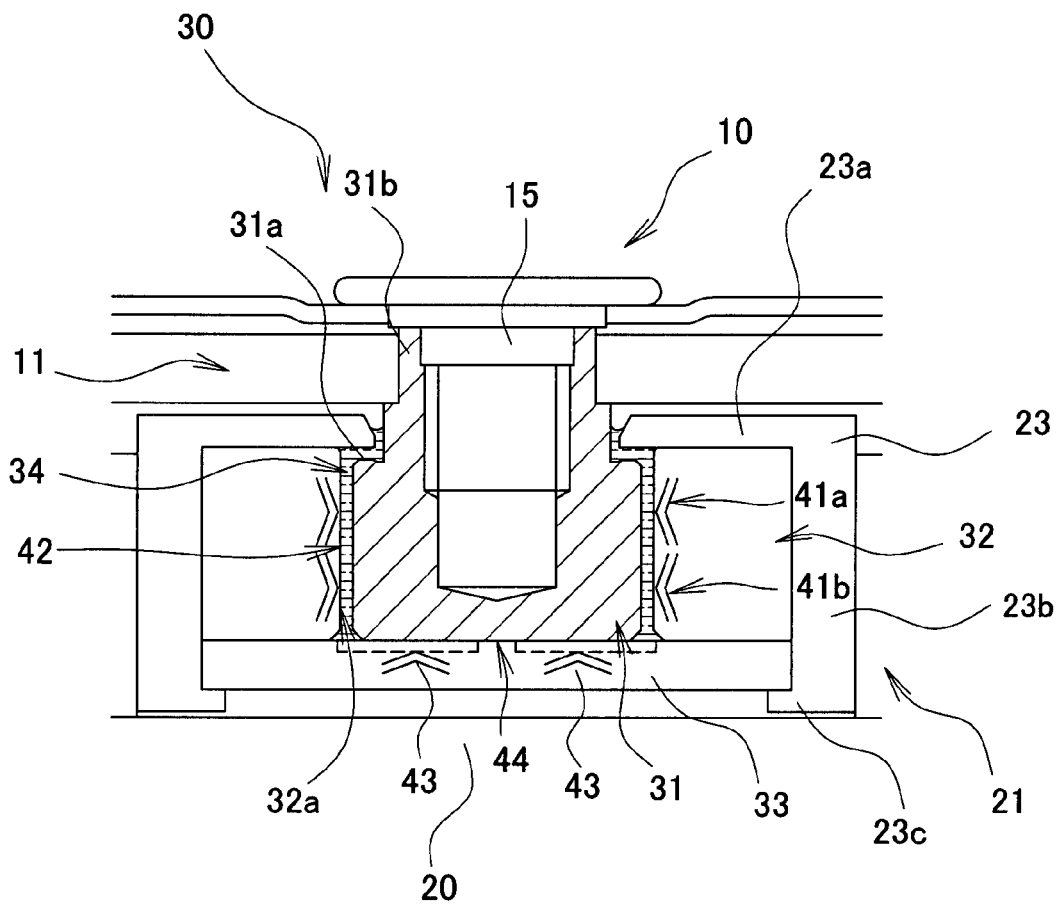
FIG. 2 is an enlarged cross sectional view of the hydrodynamic bearing included in the motor of FIG. 1.

As shown in FIG. 2, the hydrodynamic bearing 30 is fixed to an opening formed in a substantially central portion of the base 21 and supports the rotating member 10 so as to be rotatable with respect to the stationary member 20. The hydrodynamic bearing 30 mainly includes the shaft 31, the sleeve 32, a thrust plate 33, and oil (lubricant) 34. The sleeve 32 and the thrust plate 33 form a stationary member and the shaft 31 forms the rotating member.

The shaft 31 is a columnar member extending along the axial direction which is formed of a stainless steel which is one of ferrous metal materials (for example, austenitic stainless steels such as SUS 303 and the like, austenitic stainless steels with higher manganese content than normal austenitic stainless steels such as ASK8000 and the like, martensitic stainless steels such as SUS 420 and the like) or ceramics. The shaft 31 is inserted into a bearing hole 32a of the sleeve 32 so as to be rotatable. More specifically, the shaft 31 is located so as to be relatively rotatable with a clearance to an inner periphery of the bearing hole 32a, which is defined by the sleeve 32 and the thrust plate 33. The shaft 31 includes the step portion 31a with smaller diameter near an upper surface of the sleeve 32. Further, the shaft 31 includes a convex portion 31b to which the hub 11 is attached. To the convex portion 31b, the hub 11 is fixed by press-fitting, adhering, laser-welding or the like.

The sleeve 32 is a substantially cylindrical member extending along the axial direction which is formed of, for example, pure iron, stainless steel, copper alloy, sintered metal, and the like. The sleeve 32 is fixed to the base 21 via the bracket 23.

The thrust plate 33 is formed of a stainless steel which is one of the ferrous metal materials (for example, SUS420), or a cemented carbide (for example, FBI 0). The thrust plate 33 is located so as to block the substantially circular opening formed on a lower end of the sleeve 32 in the axial direction. In this way, the bearing hole 32a is formed by the sleeve 32 and the thrust plate 33.

On a surface of the bearing hole 32a, for example, the inner peripheral surface of the sleeve 32, two sets of radial hydrodynamic grooves 41a and 41b having a herringbone pattern, which are well-known in the art, are provided. On an upper surface of the thrust plate 33 (a surface opposing the shaft 31), for example, thrust hydrodynamic grooves 43 are provided. In this way, a radial bearing portion 42 including the radial hydrodynamic grooves 41a and 41b is formed between the shaft 31 and the sleeve 32. A thrust bearing portion 44 including the thrust hydrodynamic grooves 43 is formed between the shaft 31 and the thrust plate 33. A groove shape of the radial hydrodynamic grooves 41a and 41b formed on the inner peripheral surface of the sleeve 32 and the thrust hydrodynamic grooves 43 formed on the upper surface of the thrust plate 33 will be described in details later.

The oil 34 is filled in the clearance formed between the shaft 31, the sleeve 32, and the thrust plate 33 which includes the radial bearing portion 42 and the thrust bearing portion 44. As the oil 34, for example, ester oil with a low viscosity or the like may be used.

As described above, the hydrodynamic bearing 30 is a bearing of a flangeless shaft type which is formed of two radial hydrodynamic bearings and one thrust hydrodynamic bearing.

[Operation of Motor 1]

Now, an operation of the motor 1 is described with reference to FIGS. 1 and 2.

In the motor 1, when an electric current is supplied to the stator 22, a rotating magnetic field is generated, and a rotational force is applied to the rotor magnet 12. In this way, the rotating member 10 can be rotated with the shaft 31 having the shaft 31 as a center of rotation.

As the shaft 31 rotates, supporting pressures in a radial direction and the axial direction are generated at the hydrodynamic grooves 41a, 41b and 43. In this way, the shaft 31 can be supported in a non-contact state with respect to the sleeve 32. In other words, the rotating member 10 becomes rotatable with respect to the stationary member 20 in the non-contact state, realizing a rapid rotation of the recording disc 5 with a high precision.

[Shape of Radial Hydrodynamic Grooves 41a and 41b]

Figure 3:
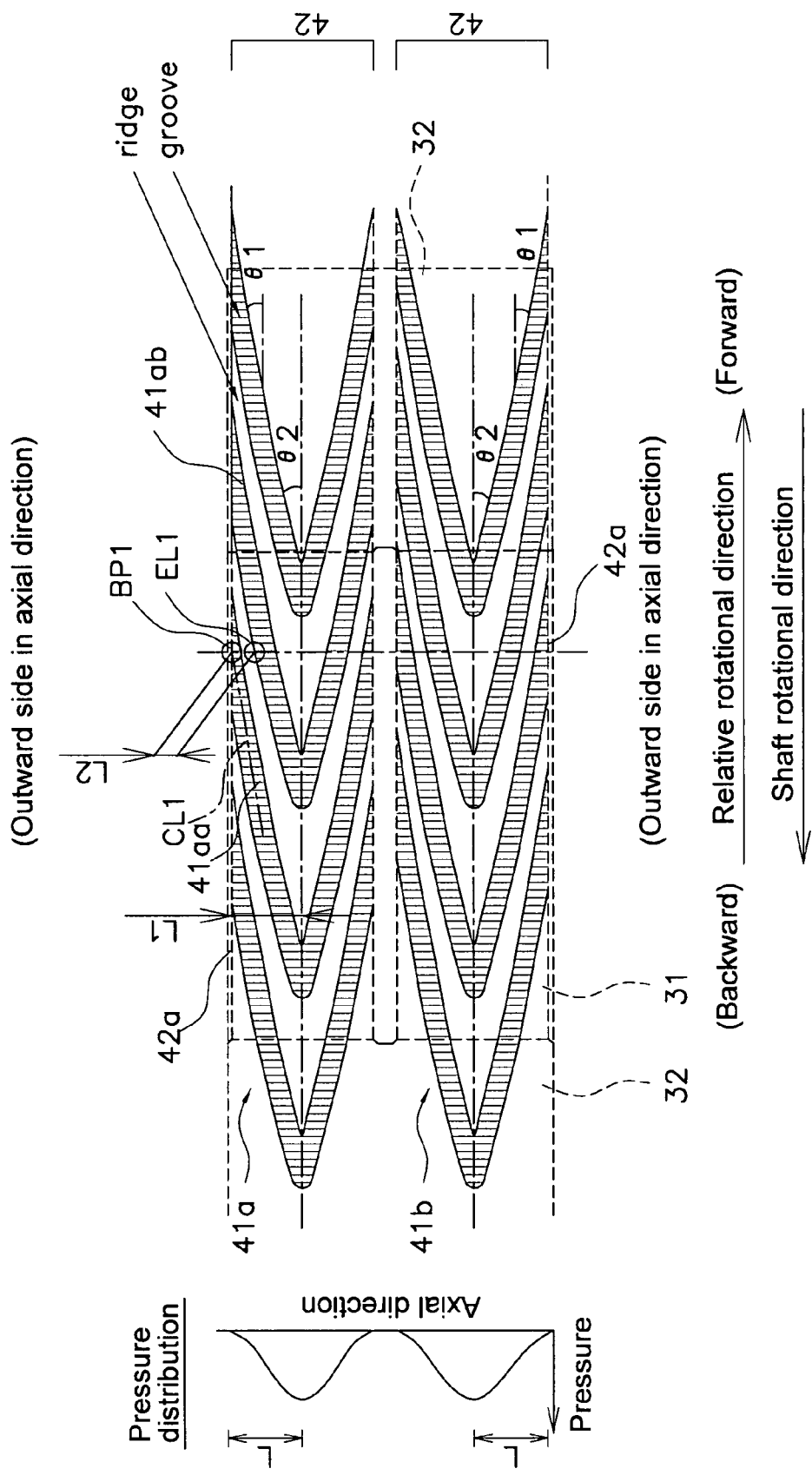
FIG. 3 is an illustrative diagram showing radial hydrodynamic grooves which form the hydrodynamic bearing of FIG. 2.

As shown in FIG. 3, two sets of the radial hydrodynamic grooves 41a and 41b formed on the inner peripheral surface of the sleeve 32 respectively include a plurality of grooves lined in a direction of rotation, and the sets are aligned side by side in the axial direction of the shaft 31. A groove shape of the radial hydrodynamic grooves 41a and 41b is in a herringbone pattern including a substantially dogleg shape formed by connecting a pair of spiral grooves having opposite groove angles, and has the shape satisfies the following relational expression (1).

$$L2 < L1/2 \qquad (1)$$

Figure 4:
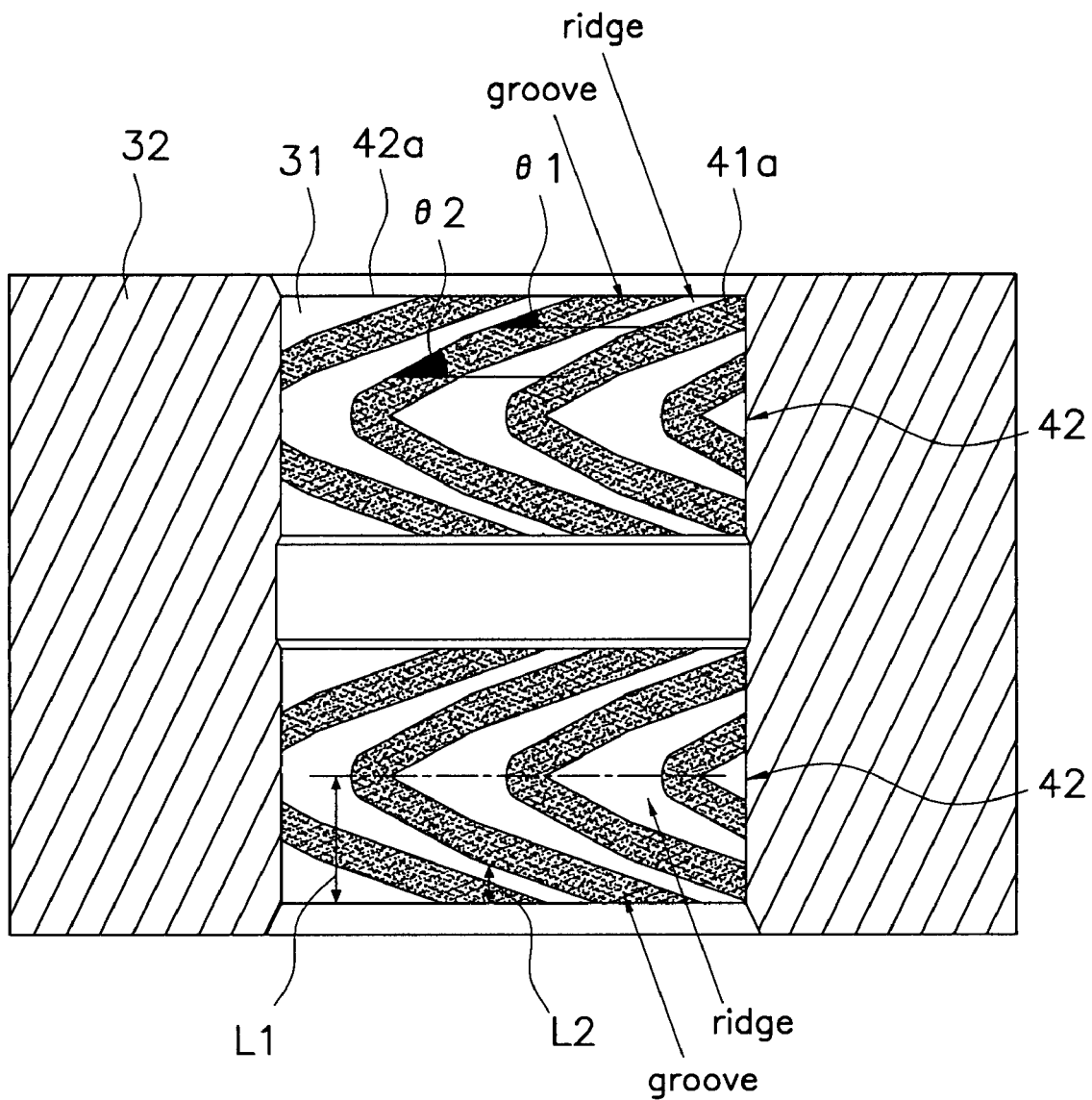
FIG. 4 is a cross sectional view showing a radial bearing portion which forms the hydrodynamic bearing of FIG. 2.

Specifically, as shown in FIG. 4, L1=1.5 mm and L2=0.6 mm.

Herein, L1 represents an axial direction length of a portion causing generation of hydrodynamic pressures at the radial hydrodynamic grooves 41a and 41b (hereinafter referred to as hydrodynamic causing portion). As shown in FIG. 3, L is from an end portion of the radial bearing portion 42 on the outward side in the axial direction to a position where the pressure peak is formed. L1 corresponds to a length of a part of the length L which has groove angles θ1 and θ2. In the radial hydrodynamic grooves 41a and 41b of the present embodiment, the length L of the hydrodynamic causing portion and the length L1 of the portion having the groove angles θ1 and θ2 are the same (L=L1). In the radial hydrodynamic grooves 41a and 41b of the present embodiment, the groove angles θ1 and θ2 vary along the axial direction. More specifically, as shown in FIG. 4, the groove angle changes at a position 0.8 mm outward from the position of the pressure peak in the axial direction. The groove angle on the outer side in the axial direction (hereinafter referred to an outer groove angle) θ1 is 10 degrees; the groove angle on the side of forming the pressure peak (hereinafter, referred to as an inner groove angle) θ2 is 15 degrees. Further, as shown in FIG. 3, when a point where an outer end portion 42a of the radial bearing portion 42 and a center line CL 1 of a predetermined radial hydrodynamic groove 41a cross each other is defined as a benchmark point BP1, length L2 corresponds to a length from the benchmark point BP1 to an end portion EL1 of a radial hydrodynamic groove 41ab which is adjacent to the predetermined radial hydrodynamic groove 41aa on a forward side in a relative rotational direction. The end portion EL1 is on the backward side of the radial hydrodynamic groove 41ab in the relative rotational direction. As used herein, the relative rotational direction means a direction opposite to a rotational direction of a rotating member, i.e., a direction opposite to the rotational direction of the shaft 31, since the radial hydrodynamic grooves 41a and 41b are formed on the sleeve 32, which is a fixed member.

The lengths as described above (lengths L, L1, and L2) are lengths in the axial direction of the shaft 31.

[Shape of Thrust Hydrodynamic Grooves 43]

Figure 5:
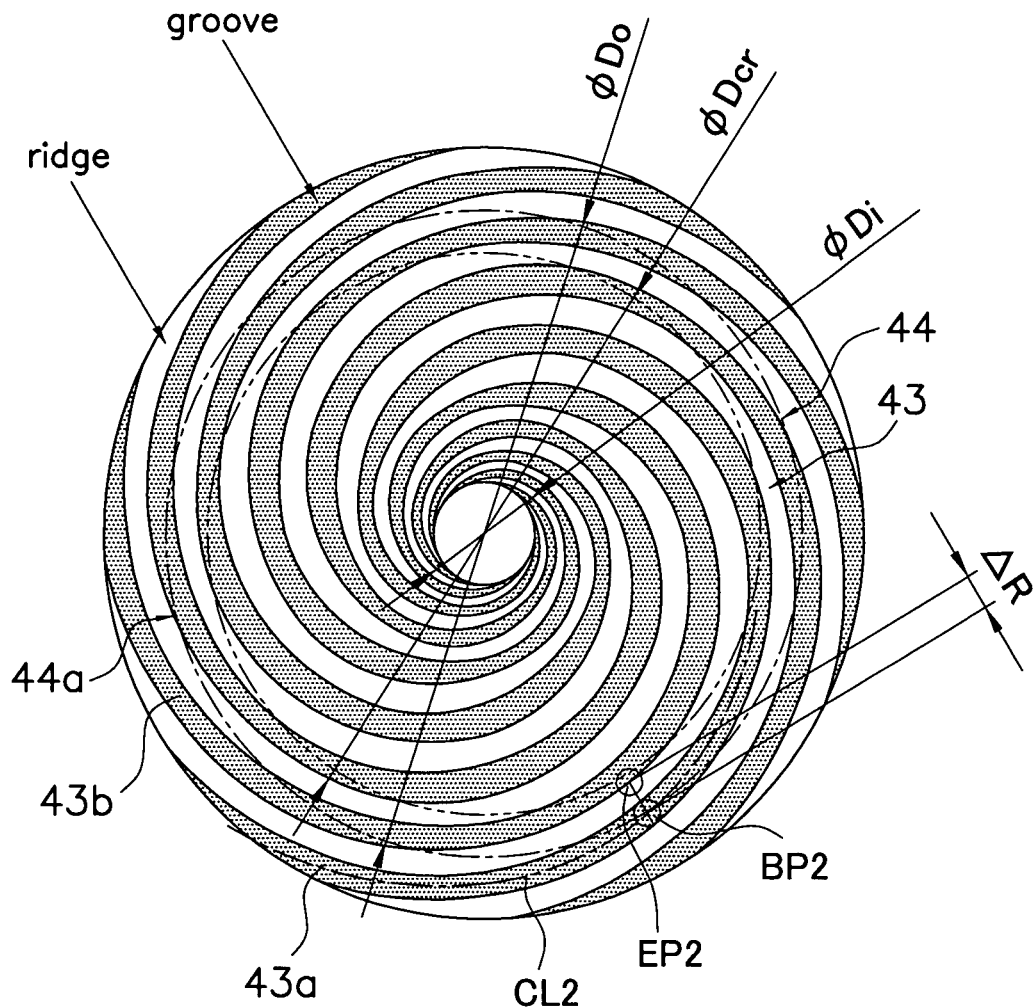
FIG. 5 is an illustrative diagram showing thrust hydrodynamic grooves which form the hydrodynamic bearing of FIG. 2.
Figure 6:
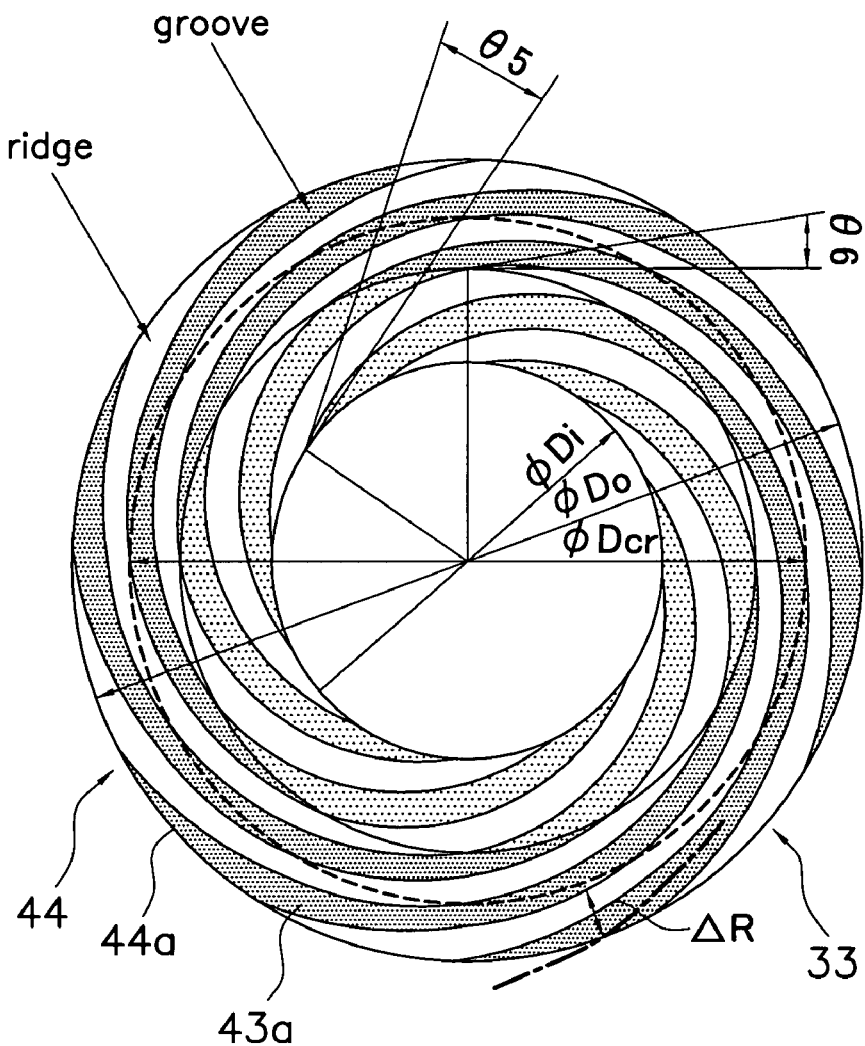
FIG. 6 is a plan view of a thrust bearing portion which forms the hydrodynamic bearing of FIG. 2.

The thrust hydrodynamic grooves 43 formed on the thrust plate 33 (see FIG. 2) are located in a spiral pattern having a rotational axis as a center as shown in FIGS. 5 and 6. The thrust hydrodynamic grooves 43 have a shape which satisfies the following relational expression (2).

$$\Delta R < (Do - Dcr)/2 \qquad (2)$$

Specifically, as shown in FIG. 5, Do=3 mm, Dcr=2.61 mm, Di=0.49 mm, and ΔR=0.157 mm.

As shown in FIG. 5, Do corresponds to an outermost diameter of the thrust hydrodynamic grooves 43 in the thrust bearing portion 44. In FIG. 5, the thrust hydrodynamic grooves 43 are extended to an area outside the thrust bearing portion 44 of the outer diameter Do. However, the area outside the outer diameter Do generates substantially no thrust hydrodynamic pressure. Thus, such an area is omitted in calculation. Further, as shown in FIG. 5, Di corresponds to an innermost diameter of thrust hydrodynamic grooves 43 in the thrust bearing portion 44. When Dcr is defined as in the following relational expression (3), an area of a circular portion having an outer diameter Dcr and the inner diameter Di is ¾ the area of the circular portion having the outer diameter Do and the inner diameter Di.

$$Dcr = \sqrt{Do^2 - \frac{(Do^2 - Di^2)}{4}} \quad (3)$$

As shown in FIG. 5, when a point where an outer end 44*a* of the thrust bearing portion 44 and a center line CL2 of a predetermined thrust hydrodynamic groove 43*a* cross each other is defined as a benchmark point BP2, ΔR corresponds to a radial direction length from the benchmark point BP2 to an end portion EL2 of a thrust hydrodynamic groove 43*b* adjacent to the predetermined thrust hydrodynamic groove 43*a* on the forward side in a relative rotational direction. The end portion EL2 is on the backward side of the thrust hydrodynamic groove 43*b* in the direction of the relative rotation. As used herein, the relative rotational direction means a direction opposite to a rotational direction of a rotating member, i.e., a direction opposite to the rotational direction of the shaft 31, since the thrust hydrodynamic grooves 43 are formed on the thrust plate 33, which is a fixed member.

Moreover, groove angles θ5 and θ6 of the thrust hydrodynamic grooves 43 of the present embodiment vary at a position remote from the center by 1.25 mm in a radius. More specifically, as shown in FIG. 6, the groove angle on the outward side in the axial direction (hereinafter referred to an outer groove angle) θ5 is 10 degrees; the groove angle on the side of forming the pressure peak (the central side) (hereinafter, referred to as an inner groove angle) θ6 is 15 degrees.

First Example

The following experiment was conducted in order to confirm that the groove shape of the radial hydrodynamic grooves 41*a* and 41*b* has an effect of reducing noises when the requirements of the present invention are satisfied. Specifically, the experiment was conducted for confirming relationship between values of L2/L1 and generated noises in hydrodynamic bearings having variable of the following four patterns (the number of layers of the radial bearing portion 42 in the axial direction of the shaft 31, N, and L1).

1) N=2, L1=1.5

2) N=2, L1=1.05

3) N=2, L1=0.45

4) N=1, L1=0.3

Figure 19:
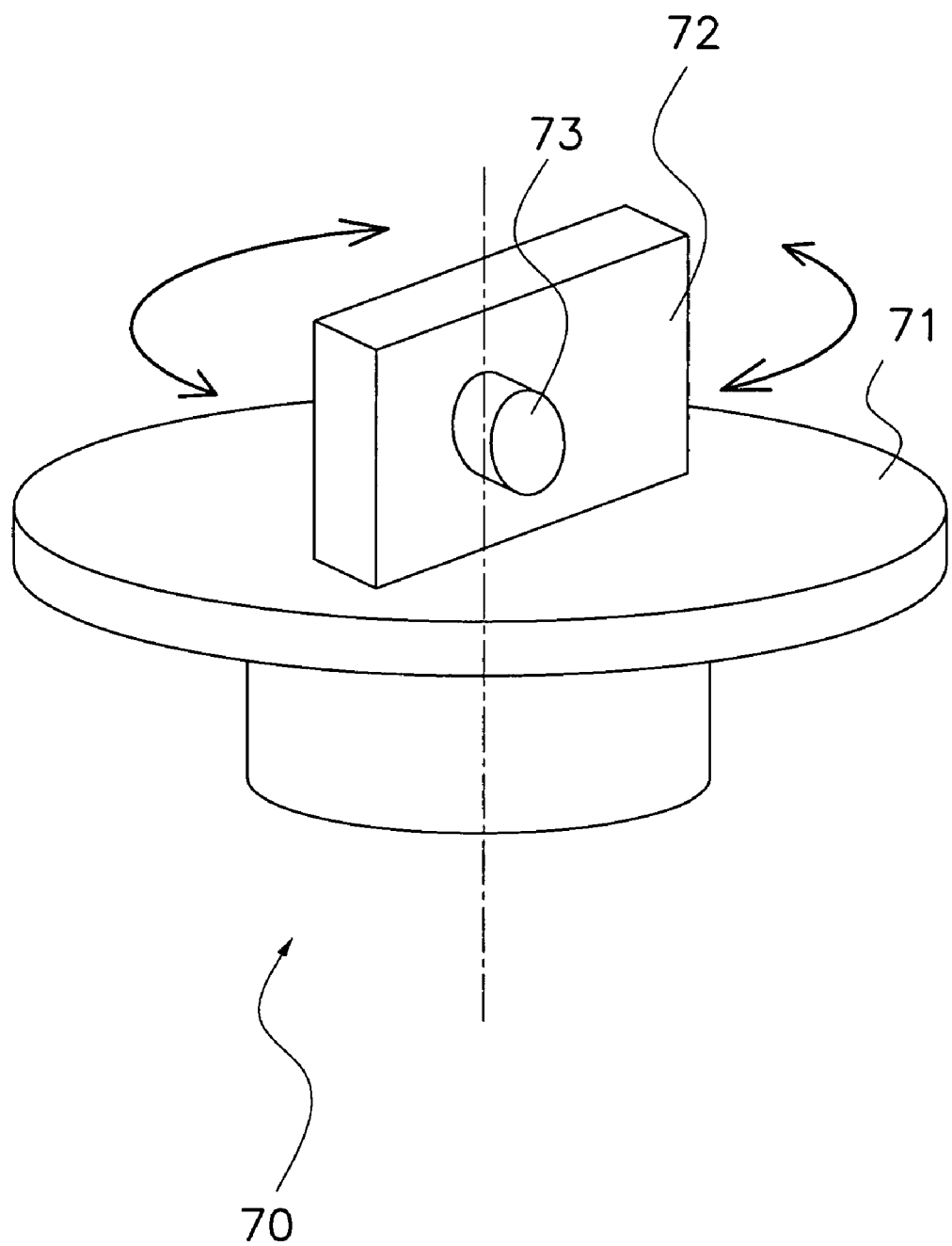
FIG. 19 is a perspective view of a swing table for measuring noises.

In order to quantitatively evaluate the noise level, a swing table device 70 as shown in FIG. 19 was prepared for measurement. On a swing table 71, an HDD 72 was placed such that a disc surface becomes perpendicular. On a lower end of a bearing portion of the HDD 72, a condenser microphone 73 was fixed with a wax. With the motor being driven, the swing table 71 was fluctuated in trapezoidal wave forms at a constant interval. More specifically, experiment was conducted with a rotation by 60° in every 0.5 seconds.

Figure 7:
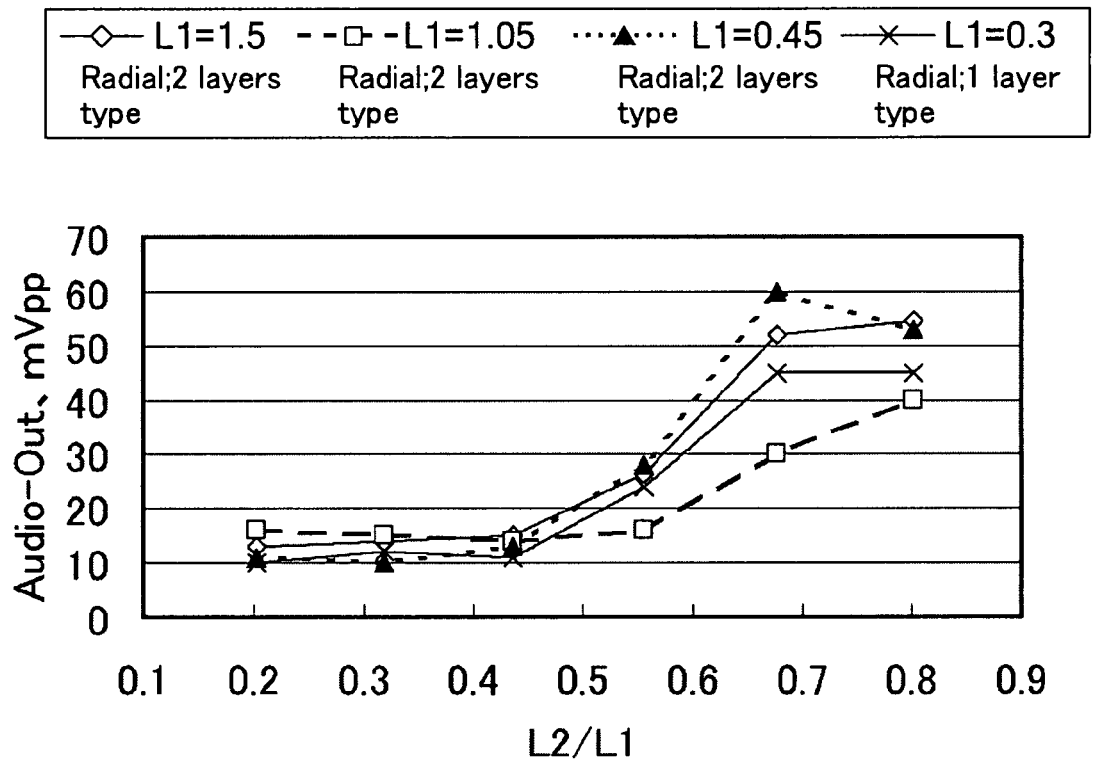
FIG. 7 shows experimental results indicating relationships between L2/L1 in the radial bearing portion and noises.

As a result, as shown in FIG. 7, in all the four patterns, the level of the generated noise had an abrupt change when the value of L2/L1 is 0.5. It is confirmed that the level of the noise becomes small in the area where L2/L1<0.5. This demonstrates that the radial bearing portion 42 including the radial hydrodynamic grooves 41*a* and 41*b* which satisfy the condition of the relational expression (1) is effective in suppressing the noise to be generated.

Next, experiment was conducted to check generated noises generated with the number N of the layers of the radial bearing portion 42 in the axial direction of the shaft 31 being fixed to two and the length L1 being fixed to 0.45 mm for the following three patterns of the values L2/L1.

a) L2/L1=0.8 b) L2/L1=0.56 c) L2/L1=0.32

Figure 8A:
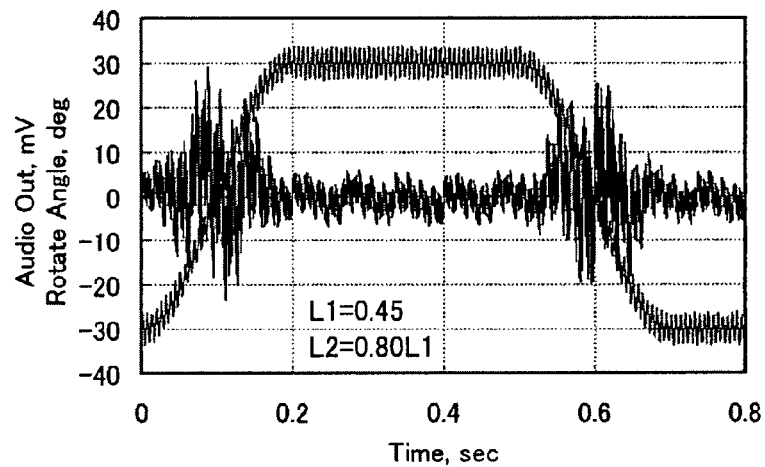
FIG. 8A shows a result of noise measurement when L2/L1 in the radial bearing portion is 0.8.
Figure 8B:
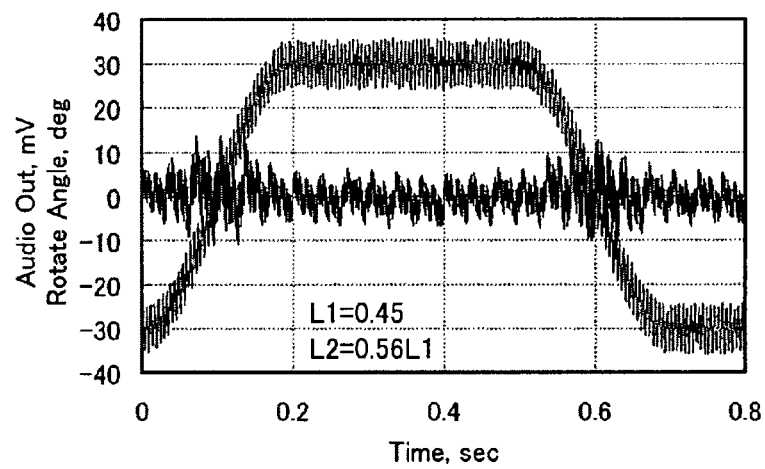
FIG. 8B shows a result of noise measurement when L2/L1 in the radial bearing portion is 0.56.
Figure 8C:
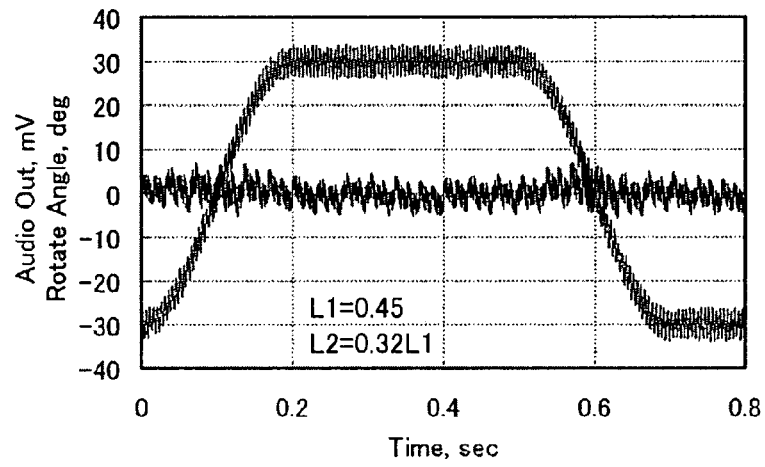
FIG. 8C shows a result of noise measurement when L2/L1 in the radial bearing portion is 0.32.

The results are shown in FIGS. 8A through 8C. FIGS. 8A through 8C show time axis waveforms of noises and rotational phase angle output waveforms of the swing table 71. FIGS. 8A through 8C show that the generated noise was the largest when L2/L1=0.8, and the generated noise was the smallest when L2/L1=0.32. This demonstrates that the radial bearing portion 42 including the radial hydrodynamic grooves 41*a* and 41*b* which satisfy the condition of the relational expression (1) is effective in suppressing the noise to be generated.

Second Example

The following experiment was conducted in order to confirm that the groove shape of the thrust hydrodynamic grooves 43 has an effect of reducing noises when the requirements of the present invention are satisfied. Specifically, experiment was conducted for confirming relationship between values of 2ΔR/(Do−Dcr) and noises in hydrodynamic bearings having a variable of the following three patterns (the number thrust hydrodynamic grooves 43, Ngr).

1) Ngr=6

2) Ngr=8

3) Ngr=10

In order to quantitatively evaluate the noise level, a swing table device 70 as shown in FIG. 19 was prepared for measurement. On a swing table 71, an HDD 72 was placed such that a disc surface becomes perpendicular. On a lower end of a bearing portion of the HDD 72, a condenser microphone 73 was fixed with a wax. With the motor being driven, the swing table 71 was fluctuated in trapezoidal wave forms at a constant interval. More specifically, experiment was conducted with a rotation by 60° in every 0.5 seconds.

Figure 9:
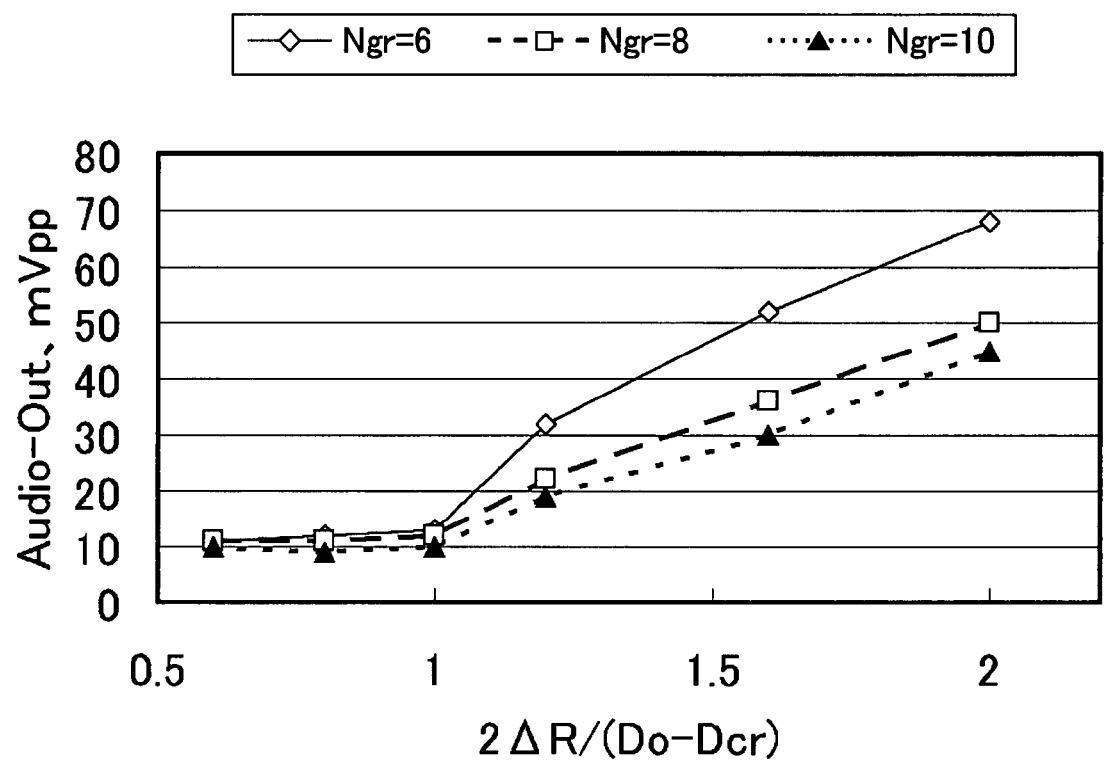
FIG. 9 shows experimental results indicating relationships between noises due to ΔR in the thrust bearing portion and noises.

As a result, as shown in FIG. 9, in all the three patterns, the level of the generated noise had an abrupt change when the value of 2ΔR/(Do−Dcr) is 1.0. It is confirmed that the level of the noise becomes small in the area where 2ΔR/(Do−Dcr) <1.0. This demonstrates that the thrust bearing portion 44 including the thrust hydrodynamic grooves 43 which satisfy the condition of the relational expression (2) is effective in suppressing the noise to be generated.

Next, experiment was conducted to check generated noises with the number of the thrust hydrodynamic grooves 43 being fixed for the following three patterns.

a) ΔR is (Do−Dcr)/2 multiplied by 2.0 b) ΔR is (Do−Dcr)/2 multiplied by 1.2 c) ΔR is (Do−Dcr)/2 multiplied by 0.6

Figure 10A:
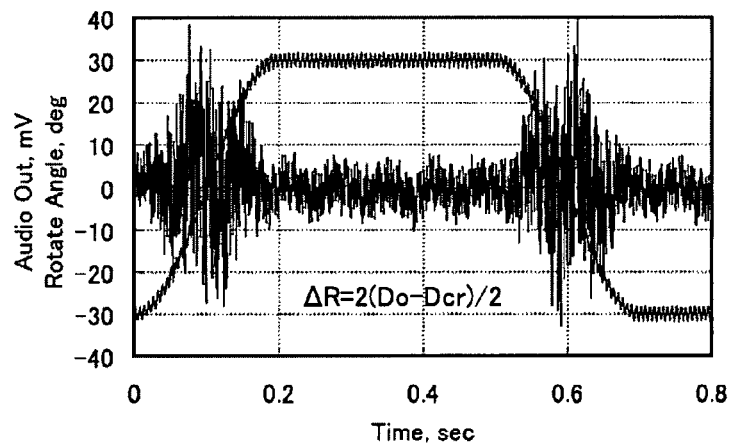
FIG. 10A shows a result of noise measurement when ΔR is (Do−Dcr)/2 multiplied by 2.0 in the thrust bearing portion.
Figure 10B:
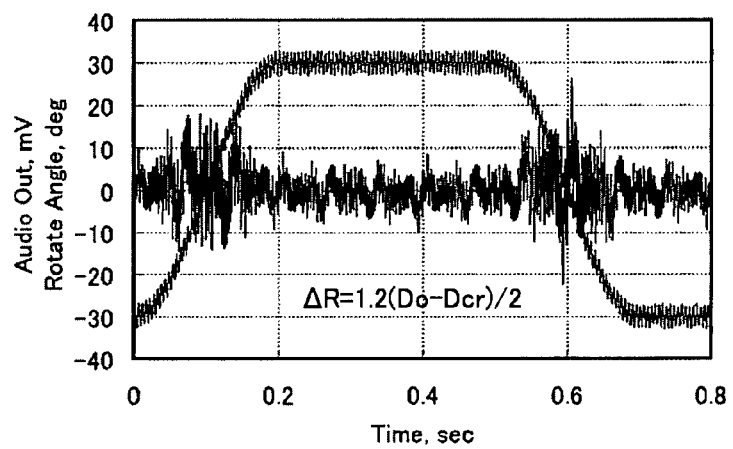
FIG. 10B shows a result of noise measurement when ΔR is (Do−Dcr)/2 multiplied by 1.2 in the thrust bearing portion.
Figure 10C:
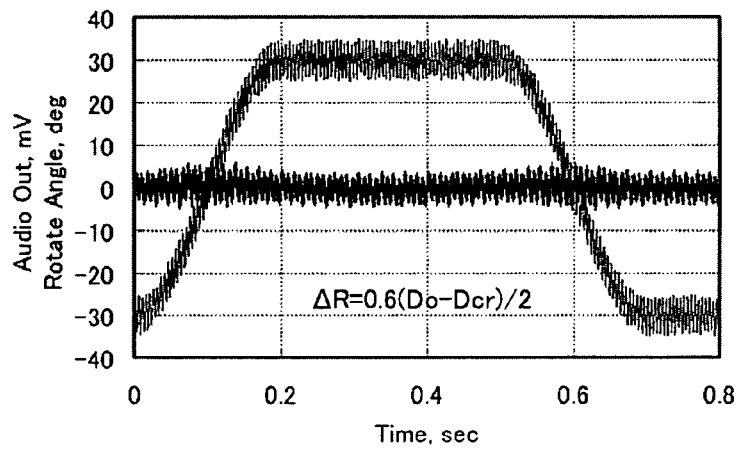
FIG. 10C shows a result of noise measurement when ΔR is (Do−Dcr)/2 multiplied by 0.6 in the thrust bearing portion.

The results are shown in FIGS. 10A through 10C. FIGS. 10A through 10C show time axis waveforms of noises and rotational phase angle output waveforms of the swing table 71. As shown in FIGS. 10A through 10C show that the generated noise was the largest when 2ΔR/(Do−Dcr)=2.0 and the generated noise was the smallest when 2ΔR/(Do−Dcr)=0.6. This demonstrates that the thrust bearing portion 44 including the thrust hydrodynamic grooves 43 which satisfy the condition of the relational expression (2) is effective in suppressing the noise to be generated.

Third Example

The following experiment was conducted in order to confirm an effect that the hydrodynamic bearing including the thrust hydrodynamic grooves 43 which satisfy the condition for the groove shape according to the present invention secures vibration resistance property. Specifically, with the thrust bearing portion 44 having the specifications as shown in Table 1, numerical analysis experiment was conducted for moment rigidity M against the minimum clearance between the thrust plate 33 and the shaft 31. Table 1 shows specifications of the thrust bearing portion which forms the hydrodynamic bearing of FIG. 2 and a conventional thrust bearing portion;

TABLE 1

|  | Bearing diameter | Conventional bearing |
|---|---|---|
| Bearing diameter | φ2~φ3 | φ2~φ3 |
| Groove angle | Inside15", Outside10" | 15" |
| Groove angle modified position | φ2 | — |
| Groove width ratio (ratio between groove and ridge) | 1:1 | 1:1 |
| Groove depth | 7 μm | 7 μm |
| Lubricant viscosity | 13 cP | 13 cP |
| Rotation rate | 3600 rpm | 3600 rpm |

Figure 11:
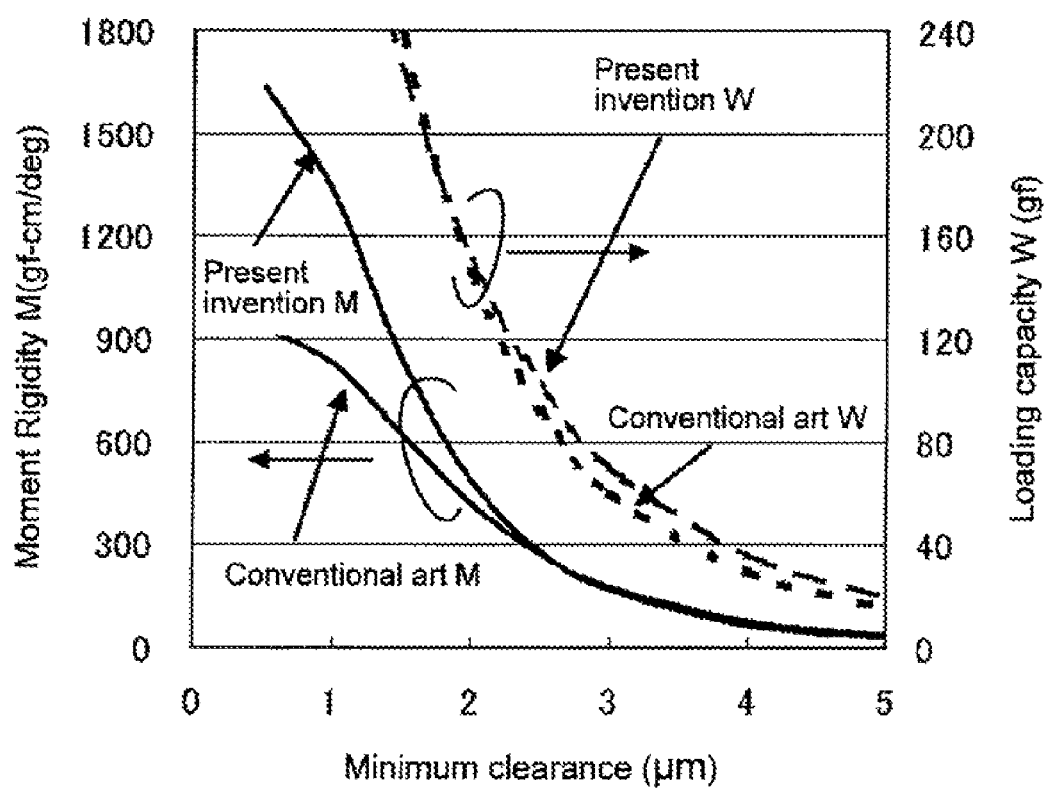
FIG. 11 shows moment rigidities with respect to a clearance at the thrust plate in the thrust bearing portion which forms the hydrodynamic bearing of FIG. 2 and the conventional thrust bearing portion.
Figures 11A, 11B:
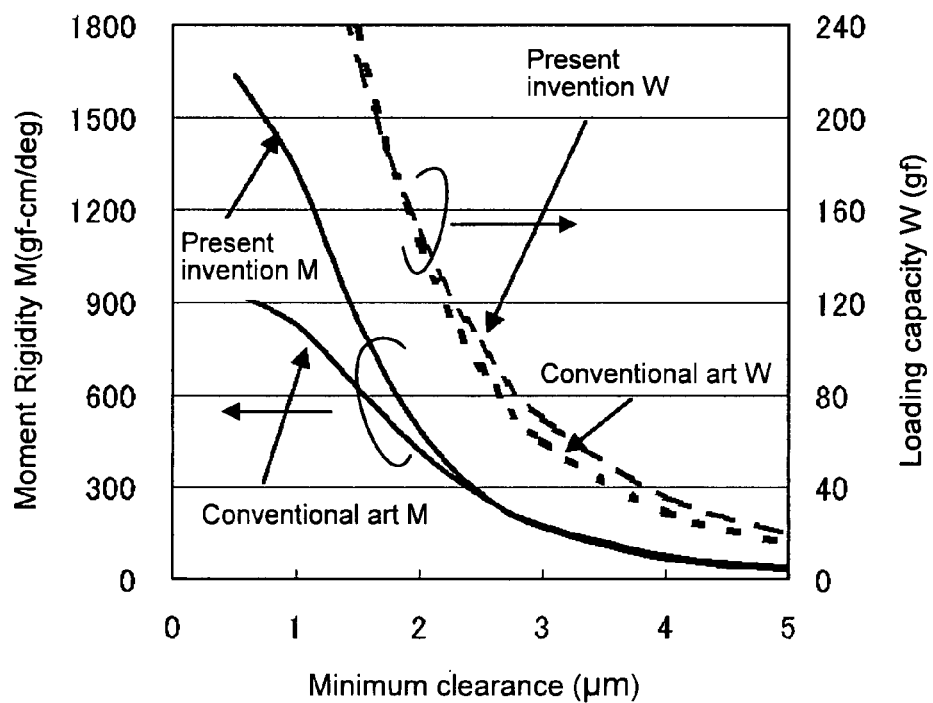

The results are shown in FIG. 11. A graph shown in FIG. 11 shows results obtained by using an ester oil used for hydrodynamic bearings at the viscosity of a typical value at normal temperature, i.e., 13 cP (13 mPa·S). It is confirmed that, compared to conventional thrust bearings, the moment rigidity M generated at the thrust bearing portion 44 by the thrust hydrodynamic grooves 43 satisfying the requirements for the groove shape according to the present invention becomes larger as the minimum clearance between the thrust plate 33 and the shaft 31 becomes smaller. This means that, in the thrust bearing portion 44 having the groove shape according to the present invention, have the vibration resistance property is secured. As shown in FIG. 11, there is almost no difference in a load capacity W representing a supporting force in the axial direction of the shaft 31 between the thrust bearing portion 44 having the groove shape according to the present invention and a thrust bearing having a conventional structure. Accordingly, it is confirmed that the moment rigidity M can be improved without sacrificing the value of the load capacity W in accordance with the present invention. The load capacity W is substantially equal to an attraction force of the rotor magnet 12 in the axial direction at a stationary state. Although the weight of the rotor is a few grams or less in motors for mobile use, the attraction force in the axial direction may be set on the order of tens of grams in order to ensure that an amount of displacement in the axial direction when disturbance or vibration is applied is small.

Figure 12:
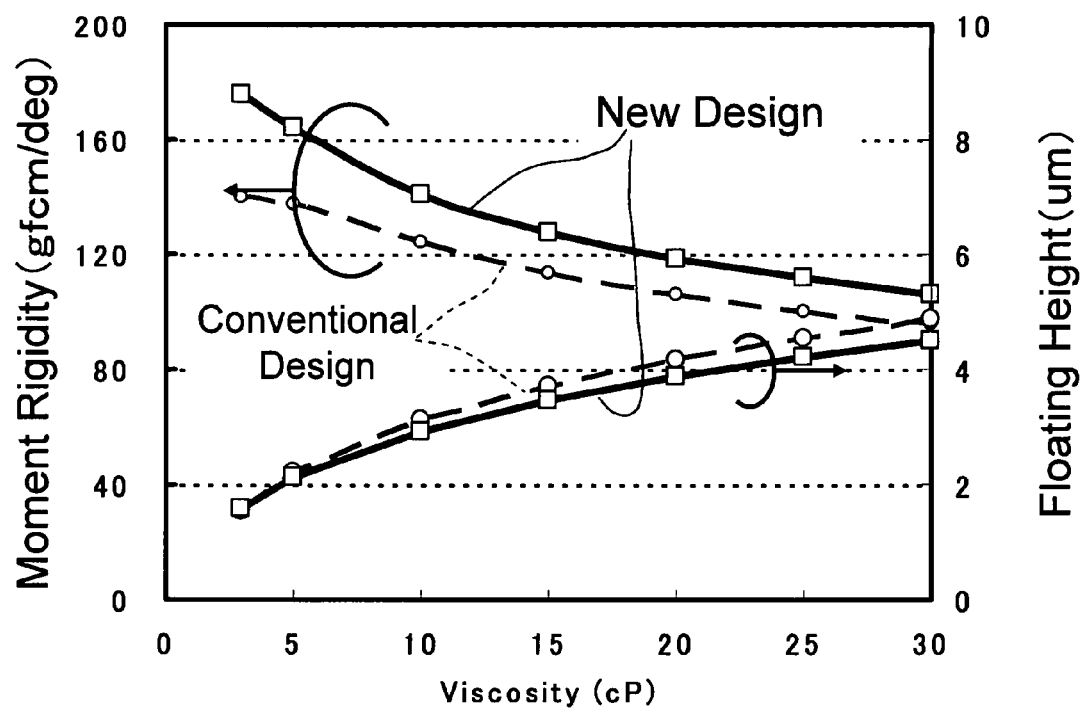
FIG. 12 shows the moment rigidities with respect to oil viscosity at the thrust plate in the thrust bearing portion which forms the hydrodynamic bearing of FIG. 2 and the conventional thrust bearing portion.

FIG. 12 shows floating height in the axial direction and moment rigidity in the thrust bearing portion 44 when oil viscosity is modified. For the calculation shown in FIG. 12, the loading capacity W is set to 50 gf. Viscosity of the typical oil mentioned above is about 3 cP at 80 to 100° C. and about 30 cP at 0 to 10° C. Thus, the results shown in FIG. 12 can help understanding bearing properties over a wide temperature range. As shown in FIG. 12, as the viscosity becomes smaller, the floating height becomes smaller. On the other hand, provided the loading capacity is constant, as the viscosity becomes smaller, the bearing rigidity becomes larger.

The floating height in the axial direction is compared between the conventional design and the design of the present invention. When the viscosity is 5 cP or higher, the floating height in the design of the present invention is slightly smaller than that in the conventional design. However, when the viscosity is 3 cP, the floating height in the design of the present invention becomes higher than that in the conventional design. The moment rigidity in the design of the present invention is always higher than that in the conventional design. The noise due to disturbance is more likely to occur as the temperature rises. In the design of the present invention, as the temperature increases (i.e., the viscosity becomes lower), the moment rigidity becomes larger than that of the conventional design much more significantly. This means that the design of the present invention can effectively suppress the noise due to disturbance at a high temperature.

When the bearing is used under even higher temperature (for example, 100° C. or higher), the viscosity of the oil becomes 2 cP or lower. In order to secure the moment rigidity even under such a circumstance, the groove depth shown in Table 1 may be made further shallower (for example, 4 μm or lower) to allow use under such a high temperature.

Figure 13A:
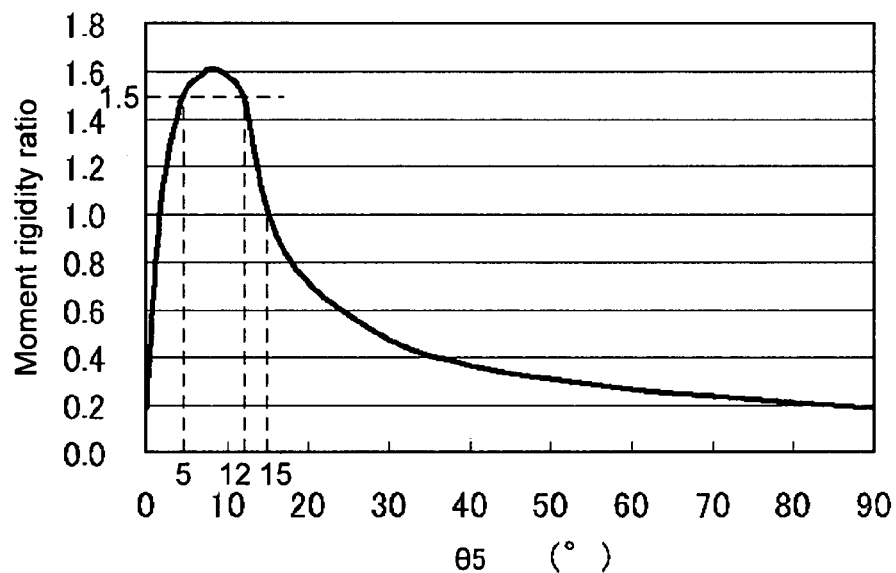
FIG. 13A shows a moment rigidity ratio compared to the conventional thrust bearing portion when an outer groove angle in the thrust bearing portion which forms the hydrodynamic bearing of FIG. 2 is modified.
Figure 13B:
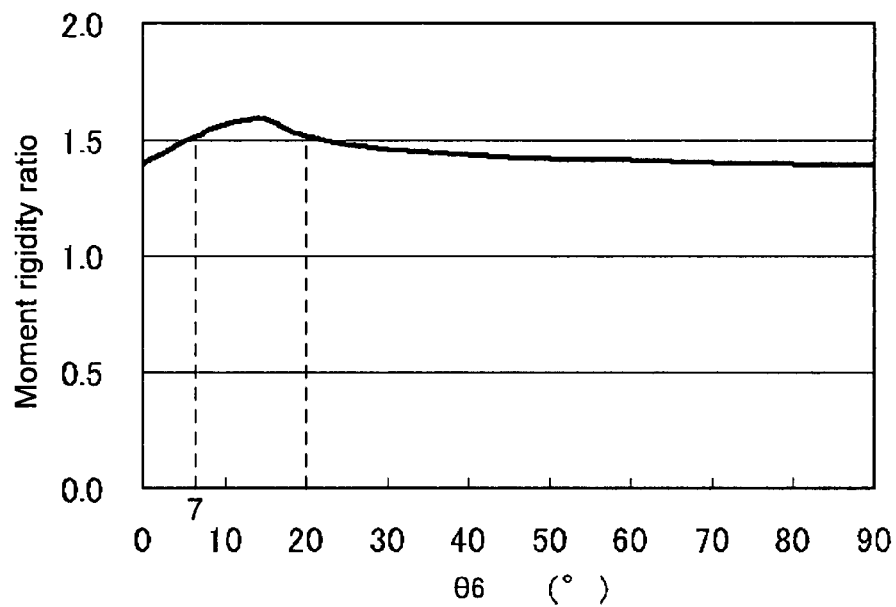
FIG. 13B shows a moment rigidity ratio compared to the conventional thrust bearing portion when an inner groove angle in the thrust bearing portion which forms the hydrodynamic bearing of FIG. 2 is modified.

Next, numerical value analysis experiment for confirming the relationship between the magnitude of the groove angle θ5 and θ6 of the thrust hydrodynamic grooves 43 according to the present invention and the moment rigidity M in the thrust bearing portion 44 was conducted. More specifically, a ratio between the moment rigidity generated at the thrust bearing having the conventional design as shown in the specification table of Table 1 and the moment rigidity generated when the outer groove angle θ5 and the inner groove angle θ6 are modified in the thrust bearing portion 44 having the design of the present invention was obtained. First, the inner groove angle θ6 was fixed to 15° and the outer groove angle θ5 was modified. As shown in FIG. 13A, it is confirmed that the moment rigidity becomes larger than that of the bearing portion of the conventional design when the outer groove θ5 is in between 3 to 15 degrees. Particularly, the range of the groove angle with which the moment rigidity ratio becomes 1.5 or higher is from 5 to 12 degrees. Next, the outer groove angle θ5 was fixed to 10° and the inner groove angle θ6 was modified. As shown in FIG. 13B, it is confirmed that the moment rigidity becomes larger than that of the conventional design across the entire range of the inner groove angle θ6. Particularly, the range of the groove angle with which the moment rigidity ratio becomes 1.5 or higher is from 7 to 20 degrees. Accordingly, it is confirmed that the moment rigidity M becomes larger than that in the conventional thrust bearing when the outer groove angle θ5 is within the range from 5 to 12 degrees and the inner groove angle θ6 is within the range from 7 to 20 degrees in the thrust hydrodynamic grooves 43 according to the present invention. This demonstrates that, in the thrust bearing portion 44 including the thrust hydrodynamic grooves 43 which satisfy the condition of the groove shape according to the present invention, the vibration resistance property is secured.

Fourth Example

A mechanism for suppressing noises according to the present invention will be described with reference to FIG. 14.

Figure 14:
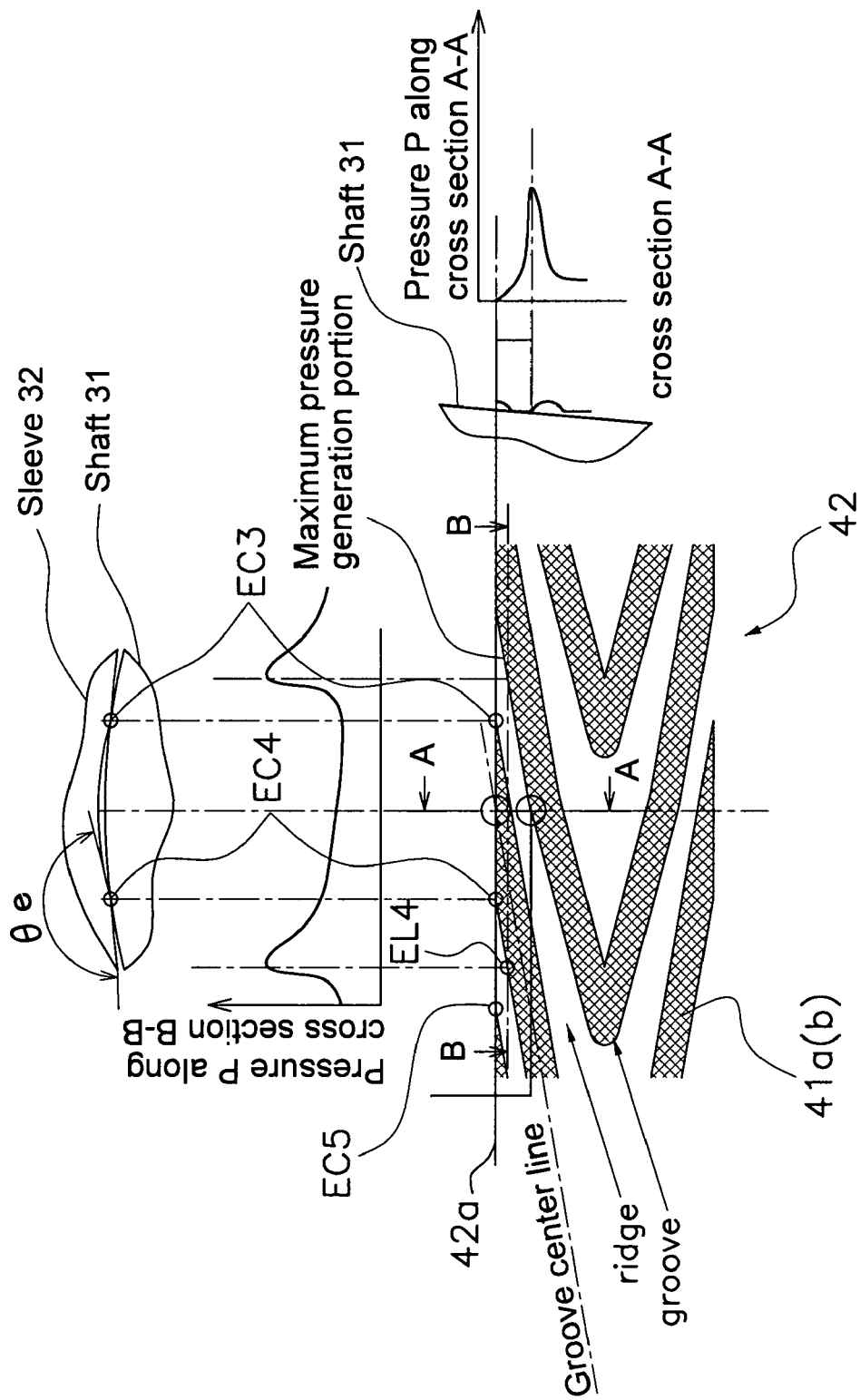
FIG. 14 is a diagram showing pressures generated in an axial direction of the shaft (A-A) and a radial direction of the shaft (B-B) in the radial bearing portion which forms the hydrodynamic bearing of FIG. 2.

FIG. 14 is a front view which shows a state where a noise tends to be generated due to a contact between the shaft 31 and the sleeve 32 in the radial bearing portion 42 utilizing the radial hydrodynamic grooves 41a and 41b which satisfy the conditions on the groove shape according to the present invention. FIG. 14 shows a state where the shaft 31 will be in contact with an edge portion between the radial hydrodynamic grooves 41a and 41b and a ridge (raised portion) which is not a groove. It is considered that a noise is generated due to contact or collision in such a case.

First, the reason why it is considered that the state shown in FIG. 14 is most likely to cause a noise is described.

Two pressure distribution charts in FIG. 14 show a pressure generated in a radial direction along an axial direction cross section (A-A) of the radial bearing portion 42 and a pressure generated in a radial direction along a rotational direction cross section (B-B) of the radial bearing portion 42 in such a state. As shown in FIG. 14, the pressure generated in the rotational direction of the shaft 31 (B-B) is maximum at an end EL4 of the radial hydrodynamic grooves 41a and 41b on the backward side in the relative rotational direction. Further, when a pressure at an arbitrary point is calculated, it becomes clear that the maximum pressure within the groove is generated on a border line on the left side which is drawn by a bold line among the borders of the groove portions shown hatched in FIG. 14.

Accordingly, when disturbance or vibration is applied to the shaft 31 and the shaft 31 becomes closer to a portion between EC4 and EC5, which is a ridge (raised portion) on the sleeve 32, the maximum pressure generation portion is located just by the end portion 42a on the outward side in the axial direction where the shaft 31 contacts the sleeve 32. In such a case, even when large disturbance is applied, there is no contact with impact. Thus, there is no strong collision.

On the other hand, when a disturbance or vibration is applied to the shaft 31 and the shaft 31 becomes closer to a portion between EC3 and EC4, which are edges of a groove on the sleeve 32, a completely different phenomenon occurs. First, on the end portion 42a of the radial bearing on the outward side in the axial direction, a radial hydrodynamic pressure is substantially zero because the portion is close to an open end of the radial bearing. Moreover, a groove center line, where the groove is deepest, is set such that there is always a clearance to the outer periphery of the shaft 31. The maximum pressure generation portion is at a remote position downward in the axial direction. Thus, a force which prevents the shaft 31 from approaching the sleeve 32 is hardly generated. Accordingly, when the shaft 31 approaches the groove portion between EC3 and EC4, it collides with an impact. Since the edges EC3 and EC4 are the edges of the groove portion, they form angles sharper than the ridge (raised portion). Therefore, the impact becomes larger, and the noise becomes larger too.

In order to prevent or mitigate such an impact, it is desirable to increase a supporting force in the radial direction at a central portion in the rotational direction between the edges EC3 and EC4 in the axial direction. Further, the supporting force is desirable to be generated as close as possible to the end portion 42a of the radial bearing portion 42 on the outward side. If such a supporting force is generated, the radial bearing end portion 42a where the sleeve 32 and the shaft 31 may contact each other can be supported with a sufficient hydrodynamic pressure in the radial direction to avert contact or to alleviate impact when they contact each other.

The shape of the radial hydrodynamic grooves 41a and 41b according to the present invention satisfy the condition L2<L1/2. With such a condition, the position in the axial direction of the supporting force generated at a central portion between the end portion EC3 on the frontward side and the end portion EC4 on the backward side can be brought to a position relatively close to the radial bearing end portion 42a where the sleeve 32 and the shaft 31 contact each other. In this way, the contact between the sleeve 32 and the shaft 31 can be averted or the impact when they contact each other can be alleviated, and thus, a noise can be suppressed. Furthermore, by setting the shape of the radial hydrodynamic grooves so as to satisfy the condition L2<L1/2, θ1 shown in FIG. 3 becomes smaller. As a result, the edge angle θe shown in FIG. 14 becomes even larger to reduce the impact at collision. Also, there is an effect that abrasion is mitigated.

The radial bearing has been used as an example to describe a mechanism of making noises smaller according to the present invention. However, a mechanism of mitigating the noise in the thrust bearing can be described similarly. Only a difference is that the radial bearing portion is defined by the relational expression of L1 and L2, while the thrust bearing portion is defined by the relational expression of Dcr, Do, and Di.

For processing the radial hydrodynamic grooves, ball rolling, NC lathe turning, electrochemical machining, etching or the like is used in general. For processing thrust hydrodynamic grooves, NC lathe turning, electrochemical machining, etching, press working such as coining or the like is widely used. Among these processing methods, ball rolling, NC lathe turning, electrochemical machining, press working such as coining and the like are particularly advantageous in terms of reducing the noise because the edge angle θe the border with the groove portion of the hydrodynamic groove can be set large.

[Feature of Motor 1]

(1)

As shown in FIG. 4, in the motor 1 of the present embodiment, L1=1.5 mm and L2=0.6 mm, and it has a shape which satisfy the following relational expression (1).

$$L2<L1/2 \qquad (1)$$

Thus, in the pressure distribution of the hydrodynamic pressure in the axial direction of the shaft 31, the hydrodynamic pressure at a position near the position where the shaft 31 and the end portion of the sleeve 32 contact each other is increased to avert the contact or to alleviate the impact when they contact each other.

As a result, even when the motor 1 is used under a situation where large vibration is expected, the vibration resistance property is secured and the noise can be suppressed.

(2)

As shown in FIG. 4, in the motor 1 of the present embodiment, the outer groove angle θ1 of the radial hydrodynamic grooves 41a and 41b is 10 degrees.

As a result, even when the shaft 31 and the end portion of the sleeve 32 collides each other, they collide smoothly. Thus, an effect of alleviating the impact when they contact each other becomes significant. This results in that the abrasion due to the collision can be suppressed and the bearing of a long life can be achieved.

(3)

In the motor 1 of the present embodiment, the groove angles θ1 and θ2 of the radial hydrodynamic grooves 41a and 41b are modified, and the inner groove angle θ2 is 15 degrees.

With such a structure, bearing rigidity in the radial translational direction can be improved without increasing abrasion or loss torque of the radial bearing portion. Such an effect can be expected as long as the groove angle is modified at a position of 20 to 80% a length of the bearing length L1.

(4)

As shown in FIG. 6, in the motor 1 of the present embodiment, Do=3 mm, Dcr=2.61 mm, Di=0.49 mm, and ΔR=0.157 mm, and it has a shape which satisfy the following relational expression (2).

$$\Delta R < (Do - Dcr)/2 \qquad (2)$$

Thus, in the pressure distribution of the hydrodynamic pressure in the axial direction of the shaft 31, the hydrodynamic pressure at a position near the portion where the shaft 31 and the thrust plate 33 contact each other is increased to avert contact or to alleviate impact when they contact each other.

As a result, even when the motor 1 is used under a situation where large vibration is expected, the vibration resistance property is secured and the noise can be suppressed.

(5)

As shown in FIG. 6, in the motor 1 of the present embodiment, the outer groove angle θ5 is 10 degrees.

As a result, even when the shaft 31 and the end of the thrust plate 33 collides each other, they collide smoothly. Thus, an effect of alleviating the impact when they contact each other becomes significant.

(6)

In the motor 1 of the present embodiment, the groove angles θ5 and θ6 of the thrust hydrodynamic grooves 43 are modified, and the inner groove angle θ6 is 15 degrees.

With such a structure, rigidity of the thrust bearing in the radial direction can be improved without increasing abrasion loss torque of the thrust bearing portion.

Other Embodiments

An embodiment of the present invention has been described above. However, the present invention is not limited to the above embodiment. Various modifications can be made within the scope of the gist of the invention.

(A)

In the motor 1 of the above embodiment, the shape of the radial hydrodynamic grooves 41a and 41b are described to have L1=1.5 mm and L2=0.6 mm. However, the present invention is not limited to such an example.

For example, the shape of the radial hydrodynamic grooves may have L1=0.45 mm and L2=0.18 mm, or L1=1.05 mm and L2=0.42 mm, and so on. As long as the radial hydrodynamic grooves have a shape which satisfy the relational expression (1), i.e., L2<L1/2, similar effects as those of the motor 1 according to the above embodiment can be achieved.

(B)

In the motor 1 of the above embodiment, the outer groove angle θ1 of the radial hydrodynamic grooves 41a and 41b is 10 degrees. However, the present invention is not limited to such an example.

For example, the outer groove angle θ1 of the radial hydrodynamic grooves may be 6 or 8 degrees, as long as it is within the range from 5 to 12 degrees.

(C)

In the motor 1 of the above embodiment, the groove angle of the radial hydrodynamic grooves 41a and 41b are modified in the portion between the central portion of the bearing and the end portion. However, the present invention is not limited to such an example.

For example, the groove angle of the radial hydrodynamic grooves 41a and 41b may be a constant groove angle θ1 without being modified in the portion between the central portion of the bearing and the end portion.

When the groove angle of the radial hydrodynamic grooves 41a and 41b is modified in the portion between the central portion of the bearing and the end portion, the difference between the outer groove angle θ1 and the inner groove angle θ2 may be any value as long as the outer groove angle θ1 is larger than the inner groove angle θ2.

(D)

In the motor 1 of the above embodiment, the inner groove angle θ2 of the radial hydrodynamic grooves 41a and 41b is 15 degrees. However, the present invention is not limited to such an example.

For example, the inner groove angle θ2 of the radial hydrodynamic grooves may be 8 or 18 degrees, as long as it is within the range from 7 to 20 degrees.

(E)

In the motor 1 of the above embodiment, two layers of the radial bearing portions 42 are provided in the axial direction of the shaft 31. However, the present invention is not limited to such an example.

For example, one layer or three layers of the radial bearing portion may be provided. As long as one layer is provided, similar effects as those of the motor 1 according to the above embodiment can be achieved.

(F)

In the motor 1 of the above embodiment, the groove shape of the radial hydrodynamic grooves 41a and 41b has a herringbone pattern of a substantial dogleg shape formed by connecting a pair of spiral grooves having opposite angles. However, the present invention is not limited to such an example.

Figure 15A:
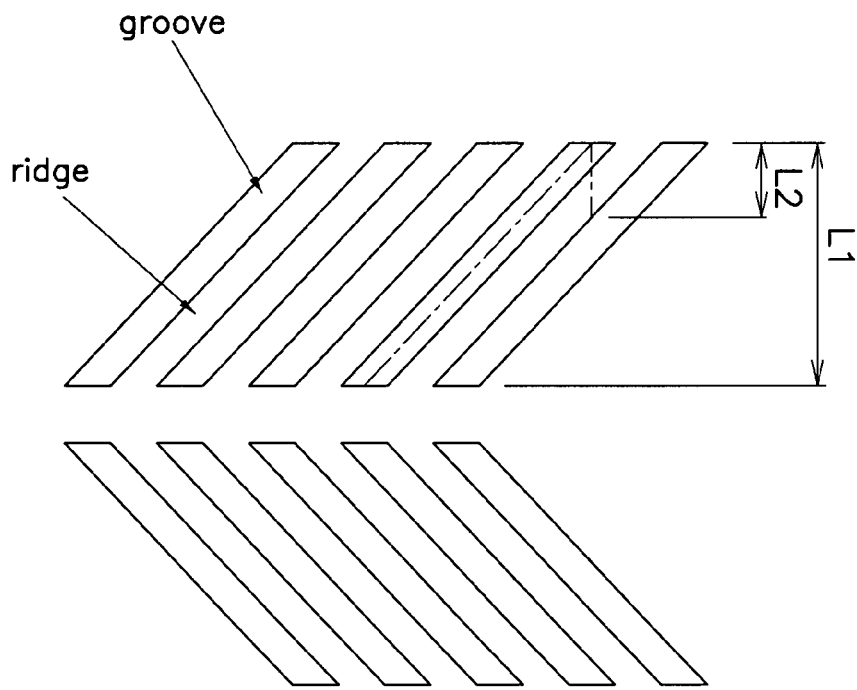
FIG. 15A shows radial hydrodynamic grooves in a spiral pattern according to another embodiment of the present invention.
Figure 15B:
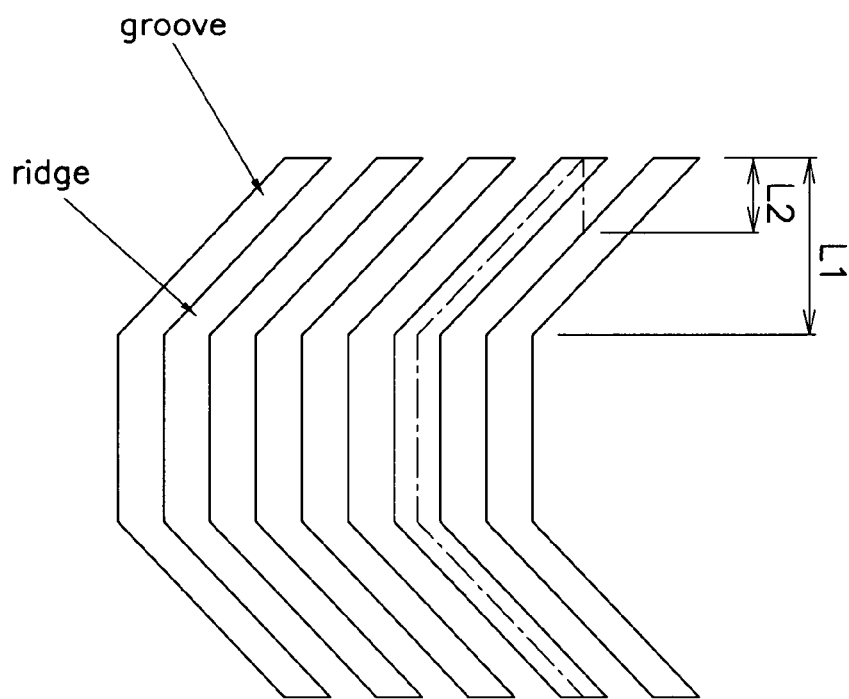
FIG. 15B shows radial hydrodynamic grooves in a herringbone pattern according to yet another embodiment of the present invention.

For example, a spiral pattern as shown in FIG. 15A or a herringbone pattern as shown in FIG. 15B may be employed. Definitions of L1 and L2 in such examples are as shown in FIGS. 15A and 15B.

Figure 18A:
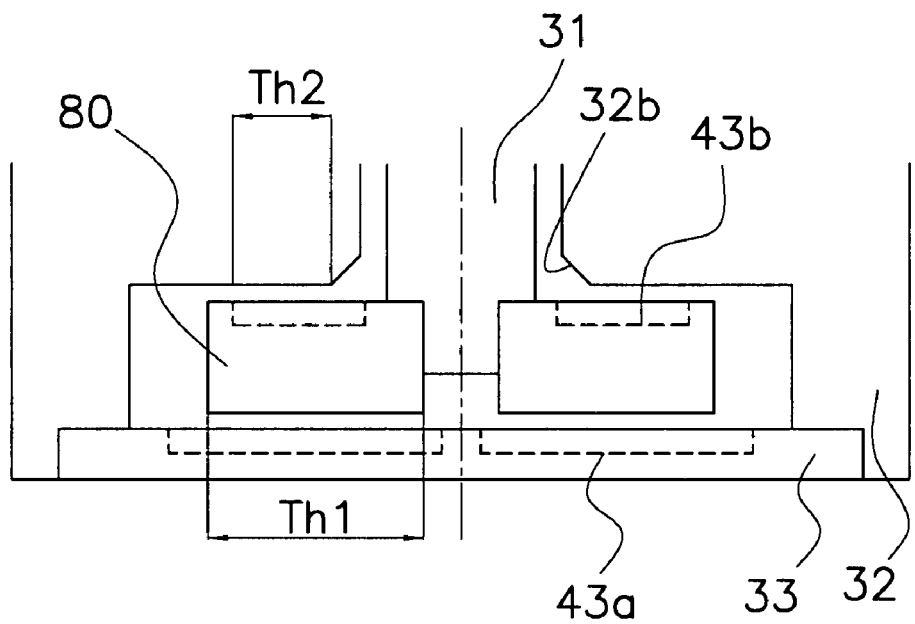
FIG. 18A is a transverse sectional view of the thrust bearing portion of the present invention.
Figure 18B:
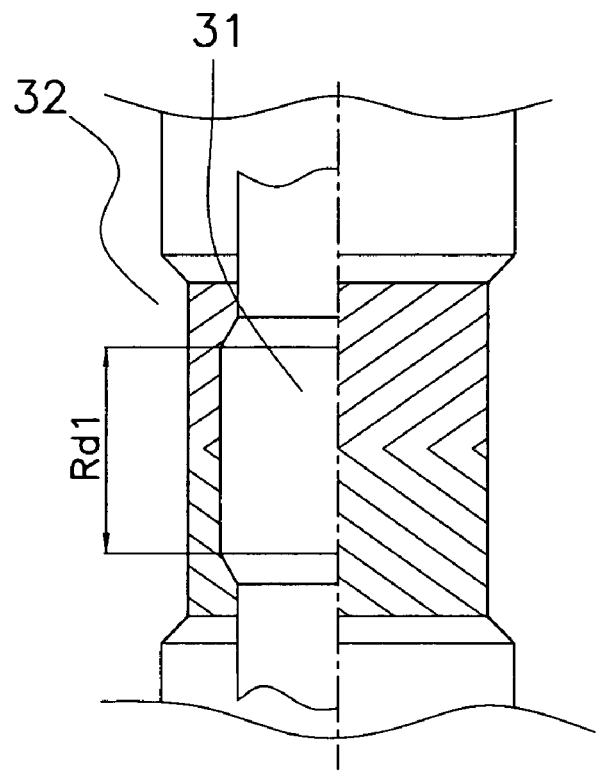
FIG. 18B is a transverse sectional view of the radial bearing portion of the present invention.

As shown in FIG. 18B, an area called radial bearing portion refers to area Rd1 where a hydrodynamic pressure in the radial direction is substantially generated. Even grooves are formed, an area which does not define a small clearance for generating a hydrodynamic pressure between the shaft and the sleeve is not included.

(G)

In the motor 1 of the above embodiment, the radial hydrodynamic grooves 41a and 41b are formed on the inner peripheral surface of the sleeve 32, and the shaft 31 is a rotating member. However, the present invention is not limited to such an example.

For example, radial hydrodynamic grooves may be formed on the shaft. The relative rotational direction in such an example refers to a direction of rotation of the shaft. Alternatively, the radial hydrodynamic grooves may be formed on the shaft and the sleeve may be the rotating member. In such an example, the relative rotational direction refers to a direction opposite to a direction of the rotation of the sleeve.

In the above embodiment, the relative rotational direction refers to a direction opposite to the direction of the rotation of the shaft 31.

(H)

In the motor 1 of the above embodiment, as shown in FIG. 6, the shape of the thrust hydrodynamic grooves 43 satisfy relationships Do=3 mm, Dcr=2.61 mm, Di=0.49 mm, and ΔR=0.157 mm. However, the present invention is not limited to such an example.

For example, the conditions may be Do=6 mm, Dcr=5.408 mm, Di=3 mm, and ΔR=0.18 mm, which means that a flange portion larger than the outer diameter of the shaft is fixed to the shaft. In such an example, similar effects as those of the motor 1 according to the above embodiment can be achieved as long as the shape of the thrust hydrodynamic grooves satisfies the relational expression (2), i.e., ΔR<(Do−Dcr)/2.

(I)

In the motor 1 of the above embodiment, the outer groove angle θ5 of the thrust hydrodynamic grooves 43 is 10 degrees. However, the present invention is not limited to such an example.

For example, the outer groove angle θ5 of the thrust hydrodynamic grooves may be 6 or 8 degrees, as long as it is within the range from 5 to 12 degrees.

(J)

In the motor 1 of the above embodiment, the groove angle of the thrust hydrodynamic grooves 43 is modified in the portion between the central portion of the bearing and the end portion. However, the present invention is not limited to such an example.

For example, the groove angle of the thrust hydrodynamic grooves 43 may be a constant groove angle θ5 without being modified in the portion between the central portion of the bearing and the end portion.

When the groove angle of the thrust hydrodynamic grooves 43 is modified between the central portion of the bearing and the end of the bearing, the difference between the outer groove angle θ5 and the inner groove angle θ6 may be any value as long as the outer groove angle θ5 is smaller than the inner groove angle θ6.

(K)

In the motor 1 of the above embodiment, the inner groove angle θ6 of the thrust hydrodynamic grooves 43 is 15 degrees. However, the present invention is not limited to such an example.

For example, the inner groove angle of the thrust hydrodynamic grooves may be 8 or 18 degrees, as long as it is within the range from 7 to 20 degrees.

(L)

In the motor 1 of the above embodiment, as shown in FIGS. 5 and 6, the thrust hydrodynamic grooves 43 formed on the thrust plate 33 are provided in a spiral pattern having the rotational axis as a center. However, the present invention is not limited to such an example.

Figure 16:
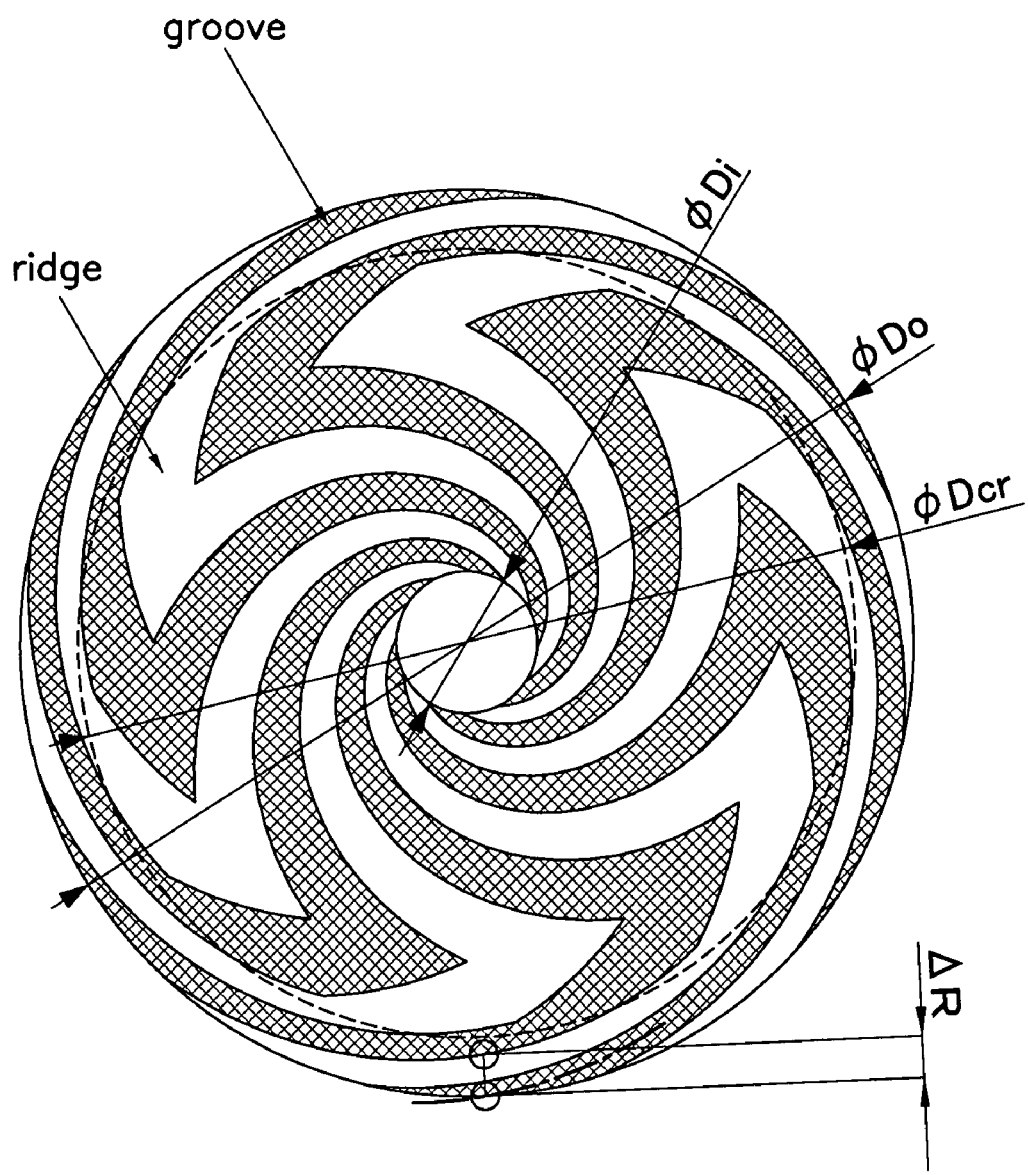
FIG. 16 shows thrust hydrodynamic grooves in a herringbone pattern according to still another embodiment of the present invention.

For example, as shown in FIG. 16, the thrust hydrodynamic grooves formed on the thrust plate may be provided in a herringbone pattern. Definitions of Do, Dcr, Di and ΔR in such an example are as shown in FIG. 16.

(M)

In the motor 1 of the above embodiment, the thrust bearing portion 44 is formed between the thrust hydrodynamic grooves 43 formed on the shaft 31 and the thrust plate 33. However, the present invention is not limited to such an example.

For example, as shown in FIG. 18A, the shaft 31 may include a thrust flange 80 which has a larger diameter than that of the shaft. And the thrust hydrodynamic grooves 43a and 43b may be formed on an upper and lower surface of a thrust flange 80.

As shown in FIG. 18A, when the thrust hydrodynamic grooves 43a and 43b are formed on an upper and lower surface of a thrust flange 80, one set may satisfy the relationship of Do, Dcr, Di and ΔR as mentioned above, or both sets may satisfy the relationship.

As described above, the thrust bearing portion refers to a portion which substantially generates a thrust hydrodynamic pressure, which correspond to areas Th1 and Th2 in FIG. 18A.

(N)

In the motor 1 of the above embodiment, the thrust hydrodynamic grooves 43 are formed on the thrust plate 33, and the shaft 31 is a rotating member. However, the present invention is not limited to such an example.

For example, thrust hydrodynamic grooves may be formed on the shaft. The relative rotational direction in such an example refers to a direction of rotation of the shaft. Alternatively, the thrust hydrodynamic grooves may be formed on the shaft and the thrust plate may be the rotating member. In such an example, the relative rotational direction refers to a direction opposite to a direction of the rotation of the shaft.

In the above embodiment, the relative rotational direction refers to a direction opposite to the direction of the rotation of the shaft 31.

(O)

In the motor 1 of the above embodiment, the stator 22 is provided on the outer peripheral side of the rotor magnet 12. However, the present invention is not limited to such an example. For example, a motor of an outer rotor type, which means that the stator is located on the inner peripheral side of the rotor magnet so as to oppose the rotor magnet, may be used. Alternatively, a so-called flat motor, which means that a ring magnet and an air core coil are located so as to oppose each other in the axial direction, may be used.

(P)

In the above embodiment, the present invention is applied to the motor 1. However, the present invention is not limited to such an example.

Figure 17:
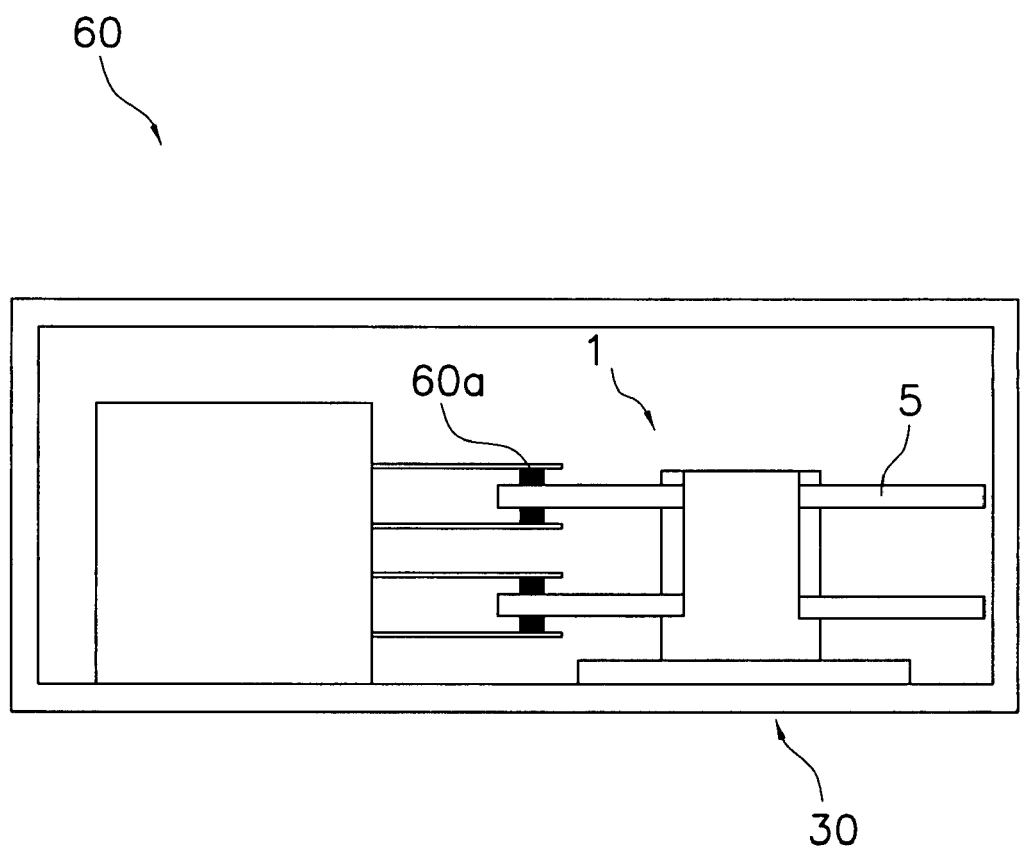
FIG. 17 is a cross section showing internal structure of a recording and reproducing apparatus according to another embodiment of the present invention.

For example, as shown in FIG. 17, the present invention may be applied to a recording and reproducing apparatus 60 for reproducing information recorded on a recording disc 5 or recording information on the recording disc 5 with a recording head 60a, which includes the motor 1 having the above described structure.

With such a structure, even when a recording and reproducing apparatus is used under a situation where a large vibration is expected, the apparatus which can secure the vibration resistance property to suppress the noise and which is compatible with miniaturization and thinning can be achieved.

According to the present invention, the vibration resistance property can be secured and the noise can be suppressed. Thus, the present invention is particularly useful for applying to recording and reproducing apparatuses for miniature camcorder which tend to be affected by punning and/or tilting.

The invention claimed is:

1. A hydrodynamic bearing, comprising:
   a sleeve having a bearing hole and an inner peripheral surface;
   a shaft having an outer peripheral surface, being disposed within the bearing hole of the sleeve so as to be rotatable relative to the sleeve, and being disposed so as to form a clearance between the sleeve and the shaft; and
   a radial bearing portion including a lubricant filling the clearance formed between the sleeve and the shaft, and radial hydrodynamic grooves formed on at least one of the inner peripheral surface of the sleeve and the outer peripheral surface of the shaft, and which generates hydrodynamic pressures in a radial direction of the shaft by relative rotation between the sleeve and the shaft, the radial hydrodynamic grooves being formed so as to satisfy the following relational expression (1):

$$L2 < L1/2 \qquad (1)$$

wherein, L1 is a length from a pressure peak generation position in a pressure distribution of the hydrodynamic pressure generated at the radial bearing portion in an axial direction of the shaft to an axial direction outer end portion which is an end portion of the radial bearing portion on an outer side in the axial direction, the length being a length of a hydrodynamic causing portion corresponding to a part which has an inclination with respect to the axial direction of the shaft, and L2 is a length in the axis direction from a benchmark point where the end portion of the radial bearing portion on the outer side in the axial direction and a groove center line along a direction elongated from a predetermined radial hydrodynamic groove cross each other, to a relative rotational direction end portion on a backward side, which is an end portion of a radial hydrodynamic groove adjacent to the predetermined radial hydrodynamic groove on a forward side in the relative rotational direction, and which is on the backward side in the relative rotational direction, and wherein a groove angle of each radial hydrodynamic groove of the radial hydrodynamic grooves is modified in a portion between a pressure peak generation position in a pressure distribution of the hydrodynamic pressure generated at the radial bearing portion in an axial direction of the shaft and the end portion on the outer side in the axial direction, and a groove angle θ1 of the radial hydrodynamic groove on the outer side in the axial direction is smaller than a groove angle θ2 of the radial hydrodynamic groove on a hydrodynamic causing portion and adjacent the pressure peak generation position.

2. A hydrodynamic bearing according to claim 1, wherein the groove angle θ2 of the radial hydrodynamic groove on the hydrodynamic causing portion and adjacent the pressure peak generation position is about 7 to 20 degrees.

3. A hydrodynamic bearing according to claim 1, wherein the groove angle θ1 on the end portion on the outer side in the axial direction is about 5 to 12 degrees.

4. A motor, comprising:
a hydrodynamic bearing according to claim 1;
a base;
a stator fixed to the base;
a rotor magnet which is disposed so as to oppose the stator, and forms a magnetic circuit with the stator; and
a hub for fixing the rotor magnet.

5. A recording and reproducing apparatus, comprising:
a motor according to claim 4;
a recording medium fixed to the hub, on which information can be recorded; and
an information access unit configured to write or read information at a desired position on the recording medium.

6. A hydrodynamic bearing, comprising:
a fixed member;
a rotating member disposed so as to oppose the fixed member, and so as to interpose a small clearance in an axial direction between the rotating member and the fixed member; and a thrust bearing portion including a lubricant filling the clearance and thrust hydrodynamic grooves formed on at least one of the rotating member and the fixed member, and which generates hydrodynamic pressures by relative rotation between the fixed member and the rotating member, the thrust hydrodynamic grooves being formed so as to satisfy the following relational expression (2):

$$\Delta R < (Do - Dcr)/2 \qquad (2)$$

wherein, Do is an outermost diameter of the thrust hydrodynamic grooves in the thrust bearing portion, Di is an innermost diameter of the thrust hydrodynamic grooves in the thrust bearing portion, Dcr is a diameter such that an area of a circular portion having the diameter Dcr as an inner diameter and the diameter Do as the outer diameter is ¼ the area of a circular portion having the diameter Di as an inner diameter and the diameter Do as an outer diameter, and ΔR is a length in the radial direction of the thrust bearing portion from a benchmark point where an outer diameter end portion of the thrust bearing portion and a groove center line along a direction elongated from a predetermined thrust hydrodynamic groove cross each other, to a relative rotational direction end portion on a backward side which is an end portion of a thrust hydrodynamic groove adjacent to the predetermined thrust hydrodynamic groove on a forward side in the relative rotational direction, and which is on the backward side in the relative rotational direction, wherein a groove angle of each thrust hydrodynamic grooves of the thrust hydrodynamic grooves is modified in a portion between an inner peripheral side of the thrust bearing portion in the radial direction and an end portion of the thrust bearing portion on an outward side in the radial direction, and a groove angle θ6 on the end portion on the outward side in the radial direction is smaller than a groove angle θ5 of the inner peripheral side in the radial direction.

7. A hydrodynamic bearing according to claim 6, wherein the groove angle θ5 of the thrust hydrodynamic groove on the inner peripheral side in the radial direction is about 7 to 20 degrees.

8. A hydrodynamic bearing according to claim 6, wherein the groove angle θ6 on the end portion on the outward side in the radial direction is about 5 to 12 degrees.

9. A motor, comprising:
a hydrodynamic bearing according to claim 6;
a base;
a stator fixed to the base;
a rotor magnet which is disposed so as to oppose the stator, and forms a magnetic circuit with the stator; and
a hub for fixing the rotor magnet.

10. A recording and reproducing apparatus, comprising:
a motor according to claim 9;
a recording medium fixed to the hub, on which information can be recorded; and
an information access unit configured to write or read information at a desired position on the recording medium.

* * * * *